United States Patent
Somasundaram et al.

(10) Patent No.: US 9,412,174 B2
(45) Date of Patent: Aug. 9, 2016

(54) NOTE RECOGNITION FOR OVERLAPPING PHYSICAL NOTES

(71) Applicant: 3M INNOVATIVE PROPERTIES COMPANY, St. Paul, MN (US)

(72) Inventors: Guruprasad Somasundaram, Minneapolis, MN (US); Ravishankar Sivalingam, Woodbury, MN (US); David M. Mahli, Woodbury, MN (US); Cristin E. Moran, St. Paul, MN (US); Richard J. Moore, Maplewood, MN (US); Pontus Axelsson, Stockholm (SE); Michael Rotstein, Stockholm (SE); Roland Persson, Stockholm (SE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 22 days.

(21) Appl. No.: 14/514,473

(22) Filed: Oct. 15, 2014

(65) Prior Publication Data
US 2015/0106699 A1 Apr. 16, 2015

(51) Int. Cl.
*G06T 7/00* (2006.01)
*G06F 3/0481* (2013.01)
(Continued)

(52) U.S. Cl.
CPC ............ *G06T 7/0079* (2013.01); *G06F 3/0481* (2013.01); *G06F 17/241* (2013.01); *G06F 17/242* (2013.01); *G06K 9/00456* (2013.01);
(Continued)

(58) Field of Classification Search
CPC ... G06F 17/21; G06F 3/0481; G06F 17/3025; G06T 7/0079; G06T 7/0081
USPC ......................................................... 715/244
See application file for complete search history.

(56) References Cited

U.S. PATENT DOCUMENTS

| 5,319,745 A | 6/1994 | Vinsonneau |
| 5,465,165 A | 11/1995 | Tanio |

(Continued)

FOREIGN PATENT DOCUMENTS

| EP | 1182861 | 2/2002 |
| JP | 2009-20813 | 1/2009 |

(Continued)

OTHER PUBLICATIONS

Boykov, "Graph Cuts and Efficient N-D Image Segmentation", International Journal of Computer Vision, 2006, vol. 70, No. 2, pp. 109-131.

(Continued)

*Primary Examiner* — Scott Baderman
*Assistant Examiner* — Seung Jung
(74) *Attorney, Agent, or Firm* — X. Christina Huang

(57) ABSTRACT

Techniques for creating and manipulating software notes representative of physical notes are described. A computing device includes a processor, an image collection module executable by the processor and configured to receive an input image of an environment having a plurality of overlapping physical notes, and an image processing engine executable by the processor and configured to process the input image with the computing device to identify the plurality of overlapping physical notes in the input image. The image processing engine determines a boundary of each note in the plurality of overlapping physical notes in the input image, and generates a plurality of digital notes corresponding to the determined boundary of each of the overlapping physical notes identified in the input image.

19 Claims, 27 Drawing Sheets

(51) Int. Cl.

| | | |
|---|---|---|
| *G06F 17/24* | (2006.01) | |
| *H04N 1/04* | (2006.01) | |
| *G06K 9/00* | (2006.01) | |
| *G06K 9/32* | (2006.01) | |

(52) U.S. Cl.
CPC ............ *G06K 9/3216* (2013.01); *G06T 7/0081* (2013.01); *H04N 1/04* (2013.01); *G06K 2009/3225* (2013.01)

(56) References Cited

U.S. PATENT DOCUMENTS

| | | | |
|---|---|---|---|
| 5,608,853 | A | 3/1997 | Dujari |
| 5,898,434 | A | 4/1999 | Small |
| 6,351,559 | B1 | 2/2002 | Zhou |
| 6,388,654 | B1 | 5/2002 | Platzker |
| 6,486,894 | B1 | 11/2002 | Abdelhadi |
| 6,721,733 | B2 | 4/2004 | Lipson |
| 6,839,466 | B2 * | 1/2005 | Venable .................... 382/199 |
| 6,956,587 | B1 * | 10/2005 | Anson ........................ 345/649 |
| 7,072,512 | B2 | 7/2006 | Mehrotra |
| 7,343,415 | B2 | 3/2008 | Kenner |
| 7,503,008 | B2 | 3/2009 | Berquist |
| 7,561,310 | B2 | 7/2009 | Joyce |
| 7,573,598 | B2 | 8/2009 | Cragun |
| 7,706,592 | B2 | 4/2010 | Liu |
| 7,774,479 | B2 | 8/2010 | Kenner |
| 7,837,094 | B2 | 11/2010 | Rhoads |
| 8,069,173 | B2 | 11/2011 | Munekuni |
| 8,113,432 | B2 | 2/2012 | Kimura |
| 8,139,852 | B2 | 3/2012 | Shinjo |
| 8,238,666 | B2 * | 8/2012 | Besley et al. .................. 382/203 |
| 8,256,665 | B2 | 9/2012 | Rhoads |
| 8,264,499 | B1 | 9/2012 | Landry |
| 8,380,040 | B2 | 2/2013 | Carter |
| 8,416,466 | B2 | 4/2013 | Takata |
| 8,429,174 | B2 | 4/2013 | Ramani |
| 8,457,449 | B2 | 6/2013 | Rhoads |
| 8,503,791 | B2 | 8/2013 | Conwell |
| 8,542,889 | B2 | 9/2013 | Sarnoff |
| 8,543,926 | B2 | 9/2013 | Giles |
| 8,558,913 | B2 | 10/2013 | Pillman |
| 8,600,167 | B2 | 12/2013 | Showering |
| 8,655,068 | B1 | 2/2014 | Li |
| 2003/0125055 | A1 | 7/2003 | Kim |
| 2004/0017400 | A1 | 1/2004 | Ly |
| 2005/0091578 | A1 | 4/2005 | Madan |
| 2006/0039045 | A1 | 2/2006 | Sato |
| 2006/0077468 | A1 | 4/2006 | Loce |
| 2006/0221357 | A1 | 10/2006 | Uzawa |
| 2007/0089049 | A1 | 4/2007 | Gormish |
| 2007/0110277 | A1 | 5/2007 | Hayduchok |
| 2007/0176780 | A1 | 8/2007 | Hart |
| 2008/0021701 | A1 | 1/2008 | Bobick |
| 2008/0075364 | A1 | 3/2008 | Speigle |
| 2008/0143739 | A1 | 6/2008 | Harris |
| 2009/0271691 | A1 | 10/2009 | Brush |
| 2009/0307607 | A1 | 12/2009 | Schauls |
| 2010/0023878 | A1 | 1/2010 | Douris |
| 2010/0096452 | A1 | 4/2010 | Habraken |
| 2010/0191772 | A1 | 7/2010 | Brown |
| 2010/0202680 | A1 | 8/2010 | Hamasaki |
| 2011/0066658 | A1 | 3/2011 | Rhoads |
| 2011/0164815 | A1 | 7/2011 | Sharma |
| 2011/0187731 | A1 | 8/2011 | Tsuchida |
| 2011/0285123 | A1 | 11/2011 | Wittke |
| 2011/0293179 | A1 | 12/2011 | Dikmen |
| 2012/0014456 | A1 | 1/2012 | Martinez Bauza |
| 2012/0042288 | A1 | 2/2012 | Liao |
| 2012/0151577 | A1 | 6/2012 | King |
| 2012/0320410 | A1 | 12/2012 | Kakegawa |
| 2012/0324372 | A1 | 12/2012 | Kowalkiewicz |
| 2013/0022330 | A1 | 1/2013 | Carter |
| 2013/0054636 | A1 | 2/2013 | Tang |
| 2013/0129206 | A1 | 5/2013 | Worthington |
| 2013/0163047 | A1 | 6/2013 | Miyamoto |
| 2013/0215297 | A1 * | 8/2013 | Hine et al. ................... 348/241 |
| 2013/0217440 | A1 | 8/2013 | Lord |
| 2013/0227476 | A1 | 8/2013 | Frey |
| 2013/0258117 | A1 | 10/2013 | Penov |
| 2013/0258122 | A1 | 10/2013 | Keane |
| 2013/0271784 | A1 | 10/2013 | Nakajima |
| 2014/0024411 | A1 | 1/2014 | Rao |
| 2014/0056512 | A1 | 2/2014 | Lerios |
| 2014/0067932 | A1 * | 3/2014 | Srinivasan et al. ............ 709/204 |
| 2014/0164852 | A1 | 6/2014 | Sumiyoshi |
| 2014/0282077 | A1 * | 9/2014 | Wilson et al. ................. 715/751 |

FOREIGN PATENT DOCUMENTS

| | | |
|---|---|---|
| JP | 2011-090486 | 5/2011 |
| WO | WO 2012-070935 | 5/2012 |
| WO | WO 2013-085512 | 6/2013 |
| WO | WO 2013-184767 | 12/2013 |

OTHER PUBLICATIONS

Davidson, "Calculation of Color Differences From Visual Sensitivity Ellipsoids", Journal of the Optical Society of America, Dec. 1951, vol. 41, No. 12, pp. 1052-1055.

Everitt, "Two Worlds Apart: Bridging the Gap Between Physical and Virtual Media for Distributed Design Collaboration", CHI 2003, Apr. 5-10, 2003, 8 pages.

Felzenszwalb, "Efficient Graph-Based Image Segmentation", International Journal of Computer Vision, 2004, vol. 59, No. 2, pp. 167-181.

Fisher, "Change Detection in Color Images", Proceedings of 7th IEEE Conference on Computer Vision and Pattern, 1999, 6 pages.

Frome, Visibility of Borders: Separate and Combined Effects of Color Differences, Luminance Contrast, and Luminance Level, J. Opt. Soc. Am., Feb. 1981, vol. 71, No. 2, pp. 145-150.

Geyer, "Experiences From Employing Evernote as a Tool for Documenting Collaborative Design Processes", Conference on Designing Interactive System DIS 2012, Workshop on Supporting Reflection in and on Design Processes, Jun. 12, 2012, 2 pages.

Gur, "Isoluminant Stimuli May Not Expose The Full Contribution of Color to Visual Functioning: Spatial Contrast Sensitivity Measurements Indicate Interaction Between Color and Luminance Processing", Vision Research, Jul. 7, 1992, vol. 32, No. 7, pp. 1253-1262.

Hsieh, "Peripheral Display of Digital handwritten notes", CHI Proceedings of the SIGCHI Conference on Human Factors in Computing Systems, Apr. 22-27, 2006, pp. 285-288.

"King jim Shot Note", [Online], [retrieved from internet on Sep. 17, 2014], URL :<http://www.kingjim.co.jp/english/products/shotnote/>, 2 pages.

Klemmer, "The Designers Outpost: A Tangible Interface for Collaborative Web Site Design", In Proceedings of UIST, 2001, 10 pages.

K-SVD, "An Algorithm for Designing Overcomplete Dictionaries for Sparse Representation", IEEE Transactions on Signal Processing, Nov. 2006, vol. 54, No. 11, pp. 4311-4322.

Masaoka, "Fast and Accurate Model for Optimal Color Computation", Optics Letters, Jun. 15, 2010, vol. 35, No. 12, pp. 2031-2033.

Mika, "Fisher Discriminant Analysis With Kernels", Neural Networks for Signal Processing IX, 1999. Proceedings of the 1999 IEEE Signal Processing Society Workshop in Neural Networks for Signal Processing IX, 1999. Proceedings of the 1999 IEEE Signal Processing Society Workshop, Aug. 1999, pp. 41-48.

Rajala, "Visual Sensitivity, to Color-Varying Stimuli", Human Vision, Visual Processing and Digital Display III, Proc. SPIE. Aug. 27, 1992, vol. 1666, pp. 375-386.

Sharma, "The CIEDE2000 Color Difference Formula: Implementation Notes, Supplementary Test Data, and Mathematical Observations", Color Research & Application, Feb. 2005, vol. 30, No. 1, pp. 21-30.

Yang, "Photonic Crystal Changes Color When Exposed to an Explosion", Nanotechnolody, SPIE Inetrnational Year of Light 2015, Apr. 25, 2011, [online], [retrieved from Internet on Sep. 18, 2014], URL:<http://spie.org/x47872.xml?pf=true&ArticieID=x47872>, 3 pages.

* cited by examiner

| Device | Phases in the approach | Data exchanged |
|---|---|---|
| Camera on Phone /Hand-held device | Image Acquisition (102) | Input: Physical media/note in the presence of other objects<br>Output: Image or Video |
| Processor on the phone | Media / Note Detection (104) | Input: Image or Video frame<br>Output: Localization of note features using color, shape and patterns |
| | Media / Note Extraction (106) | Input: Localization of note features<br>Output: Extracted notes into sub-images |
| | Media / Note Enhancement (108) | Input: Extracted notes into sub-images<br>Output: Digitally enhanced sub-images that meets quailty standards after correction for shadow, lighting, rotation, scaling, etc. |
| Web server, Personal Computer, etc. | Storage, Sharing and Secondary Processing (110) | Input: Digitally enhanced sub-images<br>Output: Secondary applications, office suites, Dropbox, Evernote, etc. |

FIG. 4

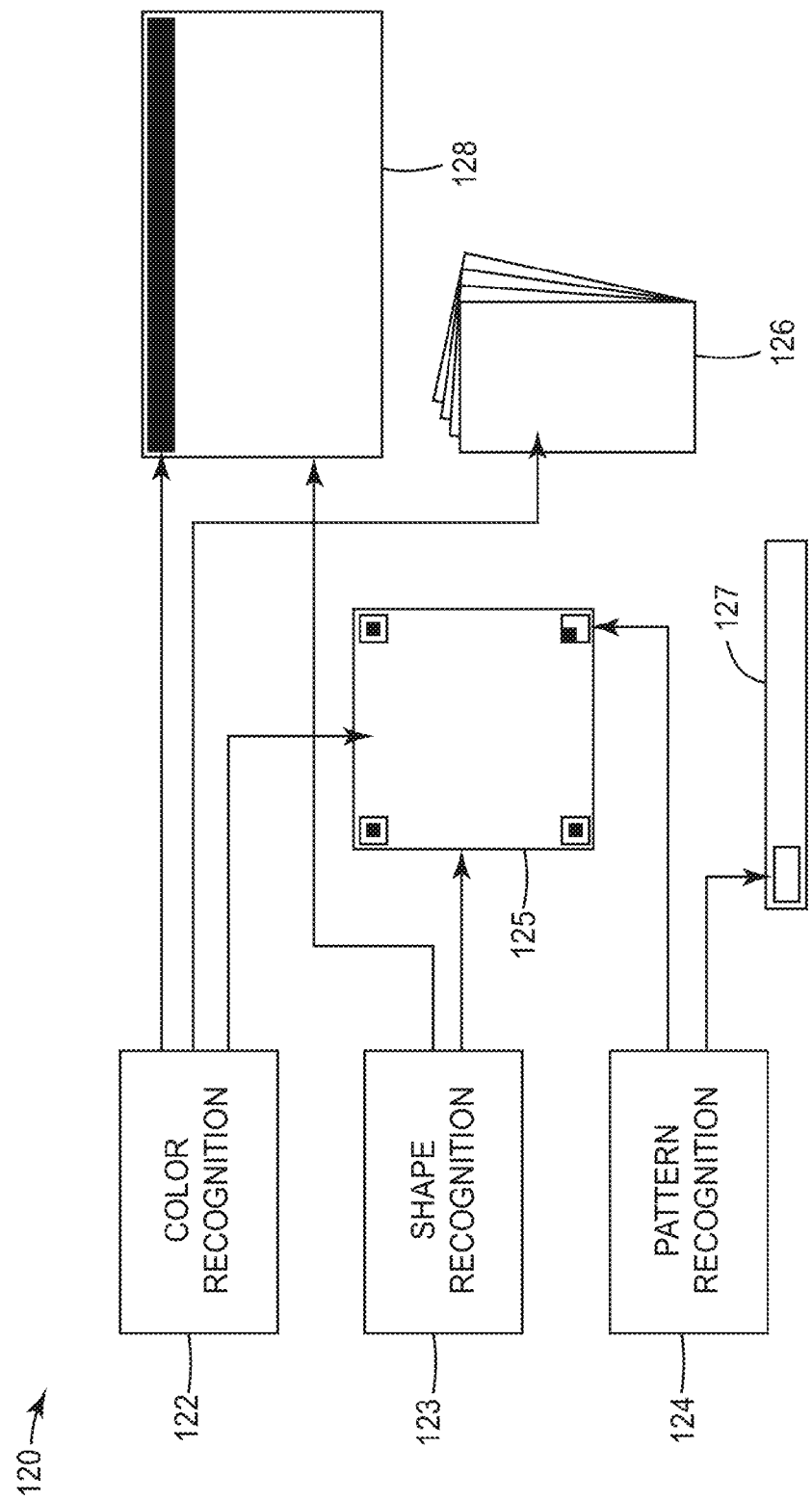

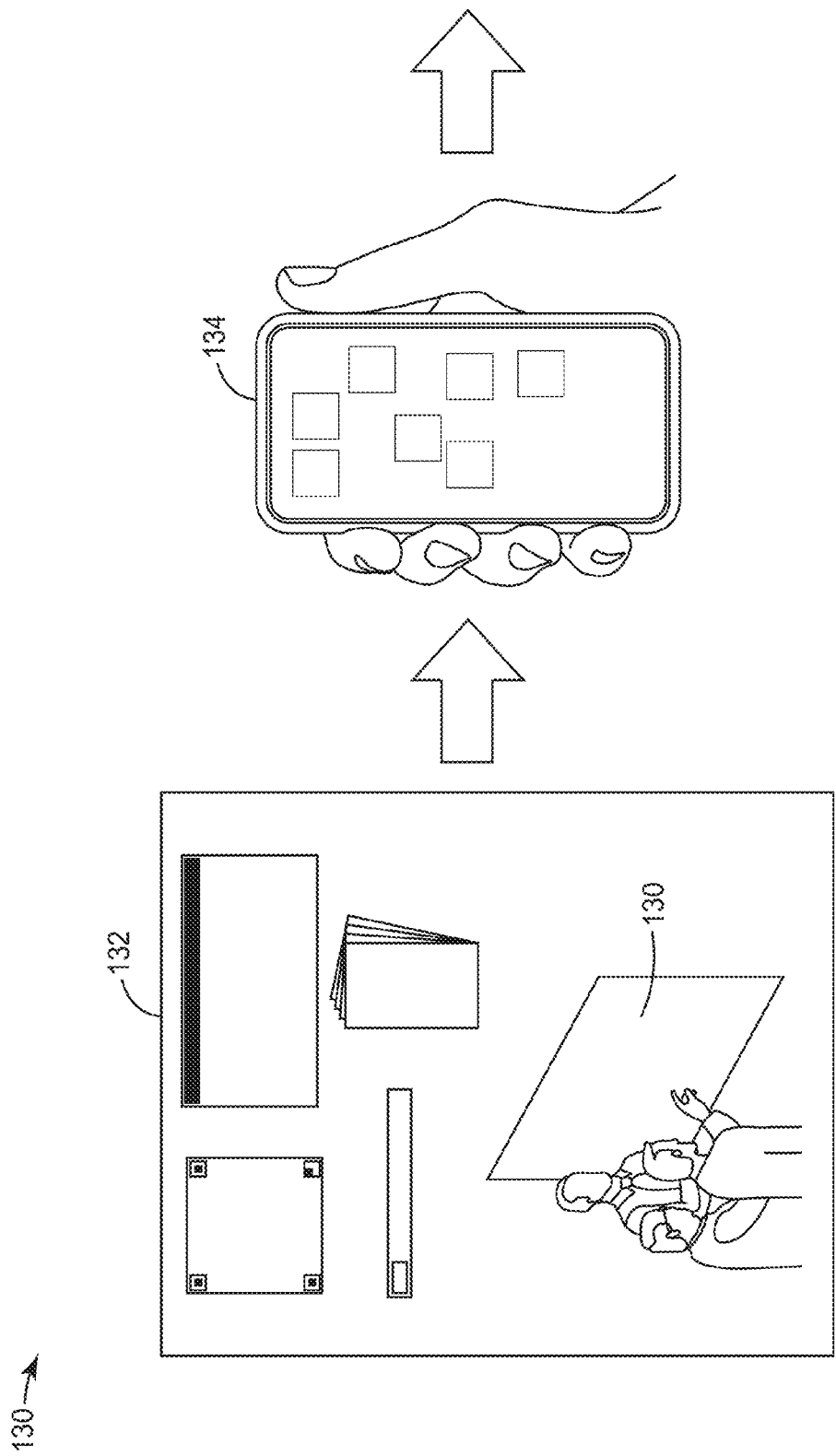

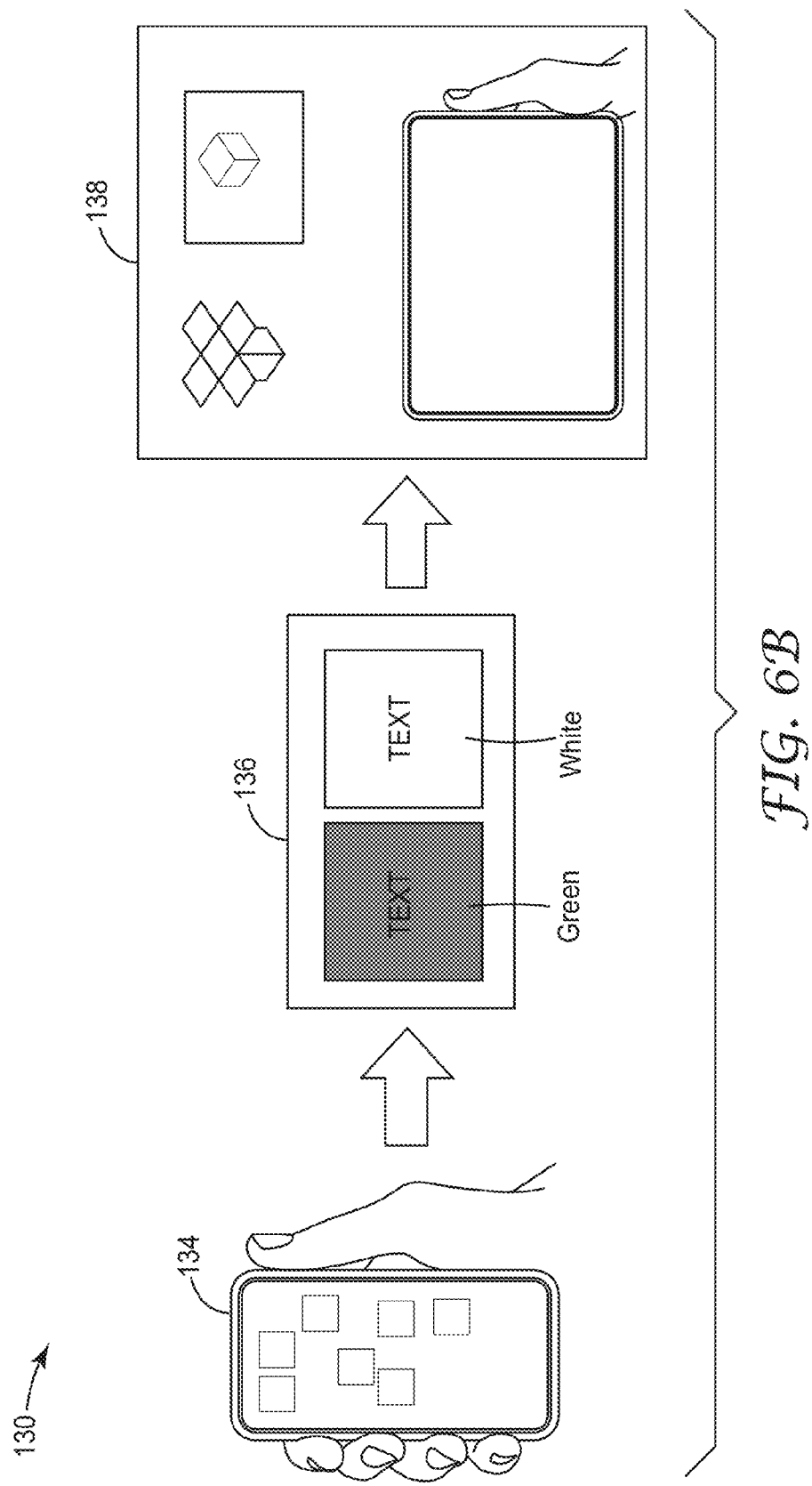

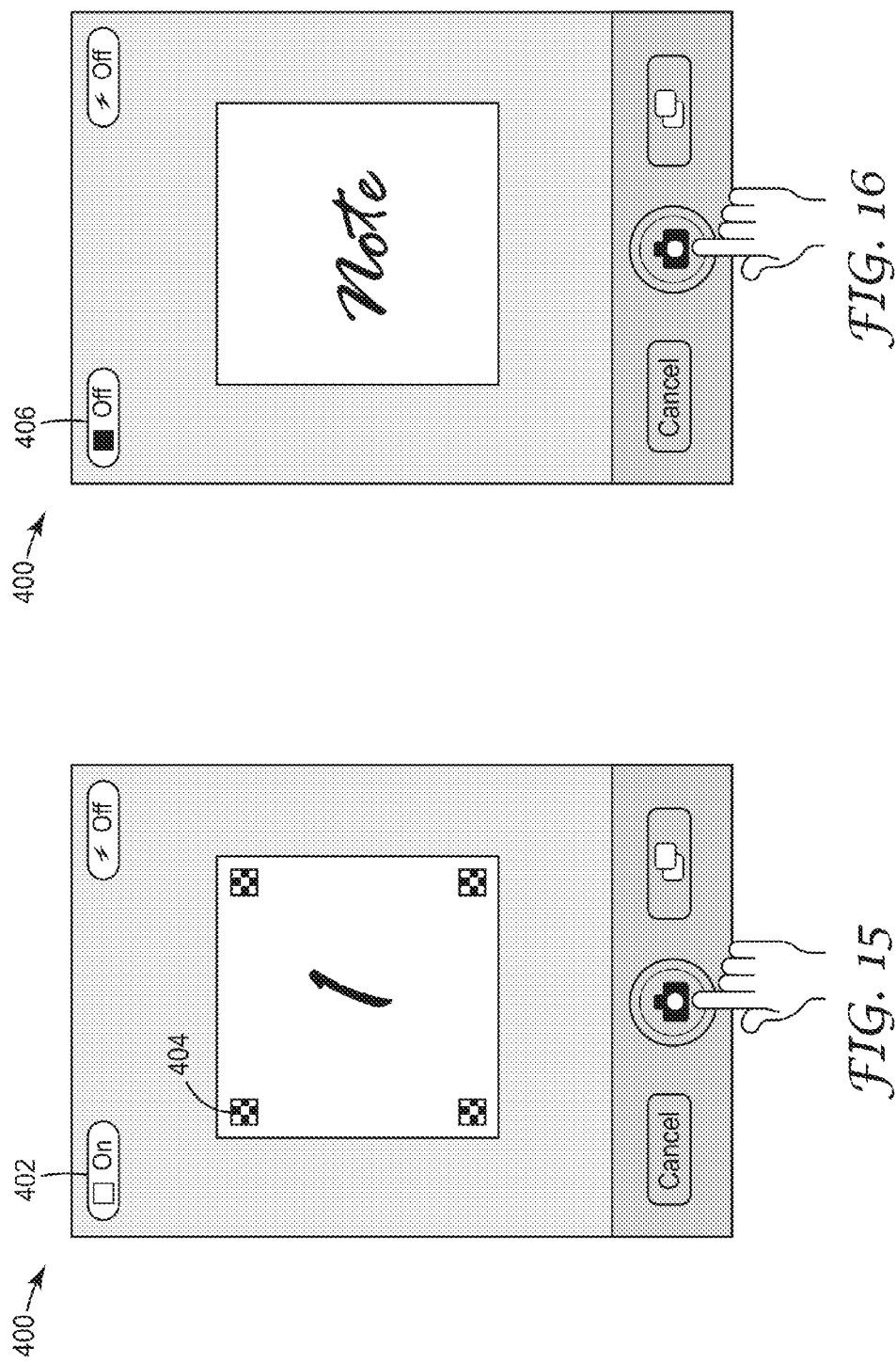

NOTE RECOGNITION FOR OVERLAPPING PHYSICAL NOTES

This application claims the benefit of U.S. Provisional Application No. 61/891,444, filed Oct. 16, 2013, the entire content of which is incorporated by reference herein in its entirety.

TECHNICAL FIELD

The present disclosure relates to note content capturing, recognition, extraction, and/or management tools and systems.

BACKGROUND

Paper notes have been broadly used in recording, sharing, and communicating ideas and information. For example, during a collaboration session (e.g., brainstorming session), participants write down ideas on Post-It® notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

For example, in many situations people participate in a collaboration session by writing information on paper-based notes, such as Post-It® notes. Paper Post-It® notes can readily be removed from a dispenser pad of sticky-back paper Post-It® notes and applied to various surfaces, such as whiteboards, documents, the tops of desks, telephones, or the like. Information can be written on paper Post-It® notes either before or after the paper Post-It® notes are detached from their dispenser pad or attached to their target surfaces. Paper Post-It® notes can be easily moved from one surface to another, such as between documents or between documents and the tops of desks, they can overlap edges or boundaries of documents, they can be layered, and they can be moved with the objects to which they are attached.

Software programs currently exist which permit computer users to generate software-based notes in digital form and to utilize the digital notes within computing environments. For example, a computer user may create digital notes and "attach" the digital notes to an electronic document, a desktop, or an electronic workspace presented by the computing environment. The computer user may manipulate the notes, allowing the notes to be created, deleted, edited, saved, and selectively viewed. The computer user may move such a note within a document, or between documents and/or the desktop, by cutting the note from a document, storing the note in a clipboard, and then pasting the note to another area of the same document or to a different document. In this way, the software programs provide a virtual representation of notes and allow an individual to utilize the digital notes in a manner similar to physical notes that he or she may use on a daily basis.

SUMMARY

In general, the disclosure describes techniques for creating and manipulating software notes representative of physical notes.

In one example, a method comprises receiving, by a computing device, an input image of an environment having a plurality of overlapping physical notes, processing the input image with the computing device to identify each of the overlapping physical notes in the input image, determining, by the computing device, a boundary of each of the overlapping physical notes in the input image, and generating, by the computing device, a plurality of digital notes corresponding to the determined boundary of each of the overlapping physical notes identified in the input image.

In another example, a non-transitory computer-readable medium comprising instructions for causing a programmable processor to receiving, by a computing device, an input image of an environment having a plurality of overlapping physical notes, process the input image with the computing device to identify each of the overlapping physical notes in the input image including determining a boundary of each of the overlapping physical notes in the input image, and generate, by the computing device, a plurality of digital notes corresponding to the determined boundary of each of the overlapping physical notes identified in the input image.

In another example, a computing device comprising a processor, an image collection module executable by the processor and configured to receive an input image of an environment having a plurality of overlapping physical notes, and an image processing engine executable by the processor and configured to process the input image with the computing device to identify the plurality of overlapping physical notes in the input image, determine a boundary of each note in the plurality of overlapping physical notes in the input image, and generate a plurality of digital notes corresponding to the determined boundary of each of the overlapping physical notes identified in the input image.

In another example, a method comprising receiving, by a computing device, an input image of an environment having a plurality of physical notes, displaying, by the computing device via a graphical user interface, the input image including a marker detection control, and receiving, by the computing device, a user input to enable or disable the marker detection control, in response to the user selection enabling the marker detection control, processing, by the computing device, the input image using a marker-based detection module to identify the plurality of physical notes in the input image, wherein the marker-based detection module detects one or more fiducial markers associated with each of the physical notes which indicate the size and the shape of the respective physical note, in response to the user selection disabling the marker detection control, processing, by the computing device, the input image using a non-marker-based detection module to identify the plurality of physical notes in the input image, and generating, by the computing device, a plurality of digital notes corresponding to the plurality of notes identified in the input image, wherein the plurality of digital notes include information represented by the plurality of notes in the input image.

In another example, a computing device comprising a processor, an image collection module executable on the processor and configured to receive an input image of an environment having a plurality of physical notes, an image processing engine executable on the processor and configured to identify a plurality of notes in the input image received by the image collection module and generate a plurality of digital notes corresponding to the plurality of notes identified in the input image, and a user interface module executable on the processor and configured to output, for display, the input image including a marker detection control and a plurality of digital notes on a first portion of a graphical user interface and the plurality of digital notes in a second portion of the graphical user interface, wherein the image processing engine is configured to, in response to a user selection enabling the marker detection control, process the input image using a marker-based detection module to identify the plurality of physical notes in the input image, wherein the marker-based detection module detects one or more fiducial markers associated with each of the physical notes which indicate the size and the shape of the respective physical note, wherein the image processing engine is configured to, in response to a user selection disabling the marker detection control, process the input image using a non-marker-based detection module to identify the plurality of physical notes in the input image.

In another example, a method comprises receiving, by a computing device, an input image of an environment having a plurality of substantially adjacent physical notes. The method further comprises processing the input image with the computing device to identify each of the substantially adjacent physical notes in the input image and, responsive to determining that the plurality of substantially adjacent physical notes in the input image comprise a substantially similar background and a border color different from the background, applying a color segmenting process to segment the substantially adjacent physical notes. The method includes generating, by the computing device, a plurality of segmented digital notes corresponding to the segmented substantially adjacent physical notes.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a flowchart illustrating one example of a technique used to convert physical notes to digital notes and storing the digital notes in a data storage device.

FIG. 5 is a block diagram illustrating an example of a note recognition technique which may use multiple note recognition modules to recognize notes and extract the content of notes.

FIGS. 6A & 6B are a flowchart illustrating another example of a note recognition technique.

FIGS. 15 & 16 illustrate an example of a marker detection toggle overlaid on an image by a graphical user interface.

DETAILED DESCRIPTION

Figure 1:
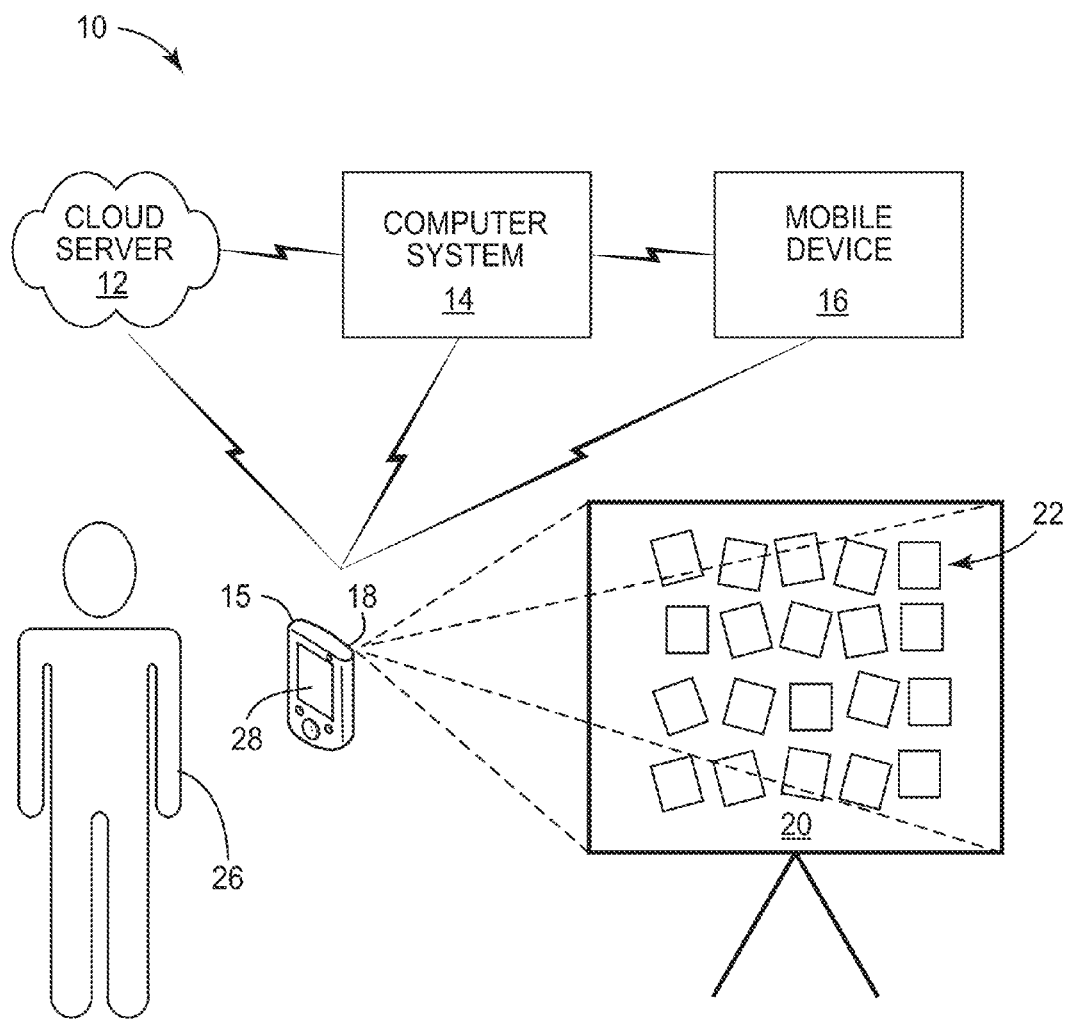
FIG. 1 is a representation illustrating one example of a user capturing an image of a workspace with notes using an image capture device on a mobile device.

The present disclosure describes techniques for creating and manipulating software notes representative of physical notes. For example, techniques are described for recognizing physical notes present within a physical environment, capturing information therefrom and creating corresponding digital representations of the physical notes, referred to herein as digital notes or software-based notes. Further, at least some aspects of the present disclosure are directed to techniques for managing multiple notes, such as storing, retrieving, editing the digital notes, categorizing and grouping the digital notes, or the like.

In general, notes can include physical notes and digital notes. Physical notes generally refer to physical objects with a general boundary and recognizable content. Physical notes can include the resulting objects after people write, draw, or enter via other type of inputs on the objects, for example, paper, white board, or other objects accepting the inputs. By way of examples, physical notes can include hand-written Post-It® notes, paper, or film, white-board with drawings, posters, and signs. In some cases, physical notes can be generated using digital techniques, e.g. printing onto printable Post-It® notes or printed document. In some cases, one object can include several physical notes. For example, several ideas can be written on separate areas of a single piece of poster paper or a white-board. In some implementations, to facilitate the recognition of these notes, marks, such as lines, shapes, colors, symbols, markers, or stickers, can be applied to the edges of the notes. Physical notes can be two-dimensional or three dimensional. Physical notes can have various shapes and sizes. For example, a physical note may be a 7.62×7.62 cm (3×3 inches) note; a physical note may be a 66.04×99.06 cm (26×39 inches) poster; and a physical note may be a triangular metal sign. In some cases, physical notes have known shapes and/or sizes. In some cases, physical notes may have known shapes and/or sizes that conform to standards, such as legal, A3, A4, and other size standards, and known shapes, which may not be limited to geometric shapes, such as stars, circles, rectangles, or the like. In other cases, physical notes may have non-standardized sizes and/or irregular shapes.

Digital notes generally refer to digital objects with information and/or ideas. Digital notes can be generated using digital inputs. Digital inputs can include, for example, keyboards, touch screens, digital cameras, digital recording devices, stylus, digital pens, or the like. In some cases, digital notes may be representative of physical notes.

In some cases, digital notes may be representative of physical notes used in a collaboration space. Collaboration space generally refers to a gathering area allowing more than one person to brainstorm, such as sharing ideas and thoughts with each other. The collaboration space can also represent a virtual space allowing a group of persons to brainstorm, such as sharing ideas and thoughts remotely, besides the gathering area. The collaboration space may be referred to as workspaces, or the like.

FIG. 1 illustrates an example of a note recognition environment 10. In the example of FIG. 1, environment 10 includes a mobile device 15 to capture and recognize one of more notes 22 from a workspace 20. As described herein, mobile device 15 provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In some examples, the plurality of physical notes 22 of workspace 20 may comprises notes of different colors. In other examples, the plurality of physical notes 22 of workspace 20 may comprise at least one note including fiducial markings, such as markings at the upper-right and lower-left corners of the note. In other examples, the plurality of physical notes 22 of workspace 20 may comprise at least one note having one color for the body of the note and another color for the border of the note. In other examples, notes from the plurality of physical notes 22 of workspace 20 may be arranged so that they overlap, such as being arranged in a stacked overlapping relationship. In other examples, notes from the plurality of physical notes 22 of workspace 20 may be arranged adjacently.

In the example implementation, mobile device 15 includes, among other components, an image capture device 18 and a presentation device 28. In addition, although not shown in FIG. 1, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of visual notes. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/ or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 28. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22. As further described below, mobile device 15 may implement techniques for automated detection and recognition of physical notes 22 and extraction of information, content or other characteristics associated with each of the physical notes. For example, mobile device 15 may allow user 26 fine-grain control over techniques used by mobile device 15 to detect and recognize physical notes 22. As one example, mobile device 15 may allow user 26 to select between marker-based detection techniques in which one or more of notes 22 includes a physical fiducial mark on the surface of the note or non-marker-based techniques in which no fiducial mark is used.

In addition, mobile device 15 provide user 26 with an improved electronic environment for generating and manipulating corresponding digital notes representative of physical notes 22, including removing background or other image-related artifacts from the notes. As another example, mobile device 15 may provide mechanisms allowing user 26 to easily add digital notes to and/or delete digital notes from a set of digital notes representative of the brainstorming activity associated with workspace 20. In some example implementations, mobile device 15 provides functionality by which user 26 is able to record and manage relationships between groups of notes 22.

In some example implementations, mobile device 15 provides functionality by which user 26 is able to export the digital notes to other systems, such as cloud-based repositories (e.g., cloud server 12) or other computing devices (e.g., computer system 14 or mobile device 16).

In the example of FIG. 1, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

Figure 2:
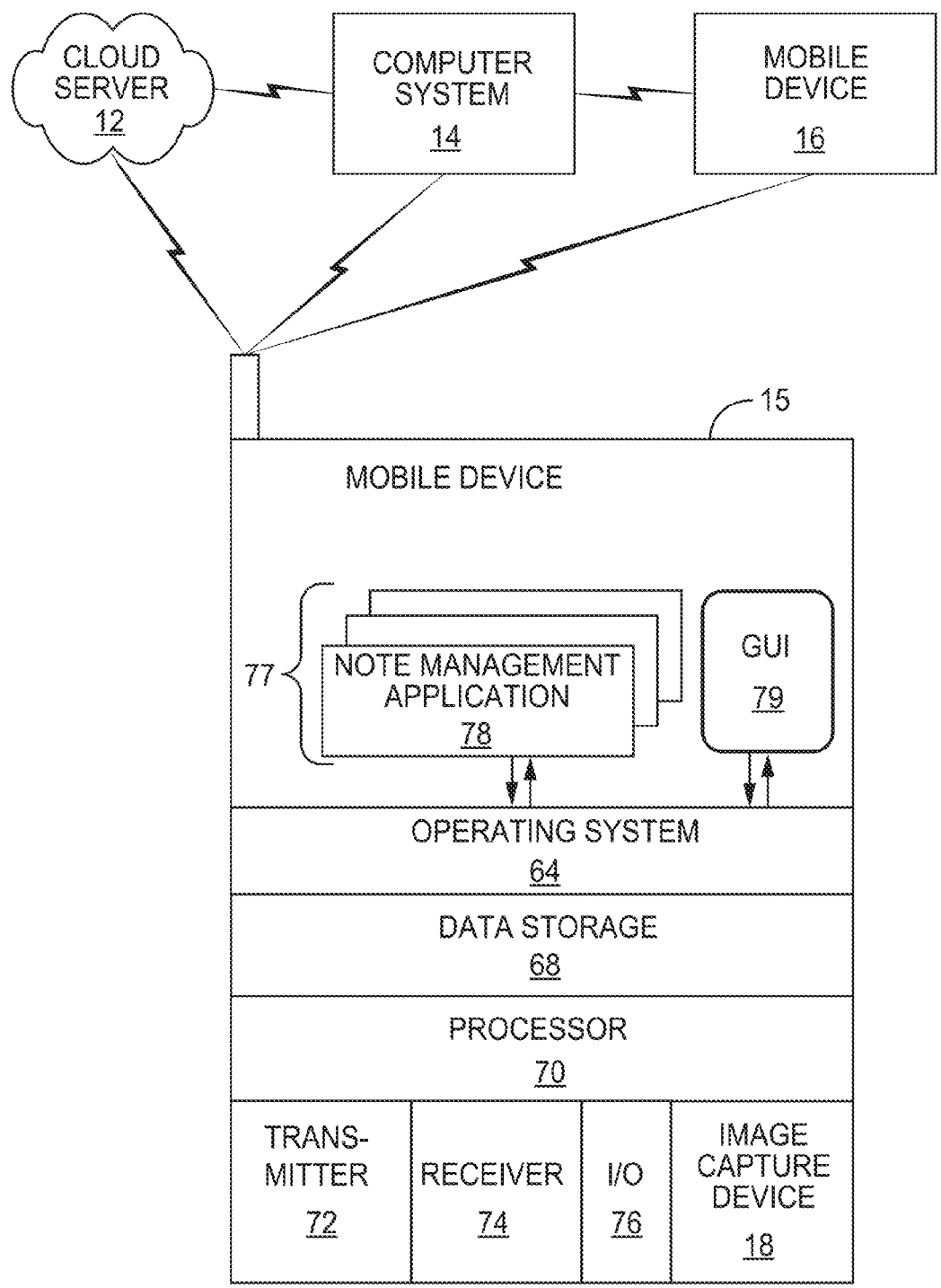
FIG. 2 is a block diagram illustrating one example of a mobile device.

FIG. 2 illustrates a block diagram illustrating an example of a mobile device that operates in accordance with the techniques described herein. For purposes of example, the mobile device of FIG. 2 will be described with respect to mobile device 15 of FIG. 1

In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1. Transmitter 72 and receiver 74 provide wireless communication with other devices, such as cloud server 12, computer system 14, or other mobile device 16 as described in FIG. 1, via a wireless communication interface as described in FIG. 1, such as but not limited to high-frequency radio frequency (RF) signals. Mobile device 15 may include additional discrete digital logic or analog circuitry not shown in FIG. 2.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1 having of notes 22. As another example, mobile device 15 may receive image data from external sources, such as cloud server 15, computer system 14 or mobile device 16, via receiver 74. In general, mobile device 15 stores the image data in data storage 68 for access and processing by note management application 78 and/or other user applications 77.

As shown in FIG. 2, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22. For example, note management application 78 may construct GUI 79 to include a mechanism that allows user 26 to easily add digital notes to and/or deleting digital notes from defined sets of digital notes recognized from the image data. In some example implementations, note management application 78 provides functionality by which user 26 is able to record and manage relationships between groups of the digital notes by way of GUI 79.

Figure 3:
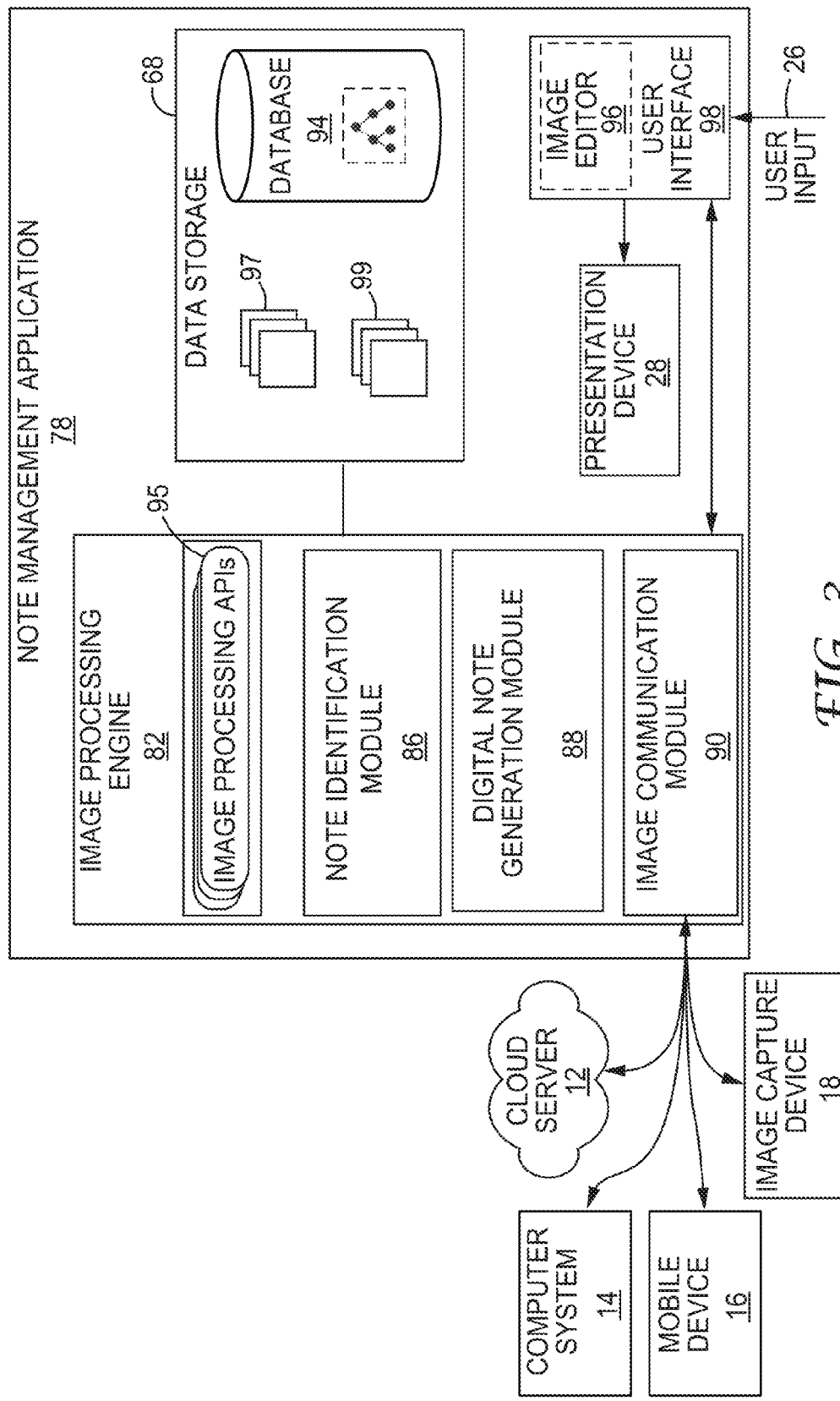
FIG. 3 is a block diagram illustrating one example of a user application to process the input image.

FIG. 3 is a block diagram illustrating one example implementation of note management application 78 that operates in accordance with the techniques described herein. Although described as a user application 77 executing on mobile device 15, the examples described herein may be implemented on any computing device, such as cloud server 12, computer system 14, or other mobile devices.

In this example, user application 78 includes image processing engine 82 that provides image processing and object recognition functionality. Image processing engine 82 may include image communication module 90, note identification module 86 and digital note generation module 88. In addition, image processing engine 82 includes image processing Application Programming Interfaces (APIs) 95 that provide a library of image manipulation functions, e.g., image thresholding, masking, filtering, edge detection, and the like, for use by the other components of image processing engine 82.

In general, image data may be stored in data storage device 68. In this example, note management application 78 stores images 97 within data storage device 68. Each of images 97 may comprise pixel data for environments having a plurality of physical images, such as workspace 20 of FIG. 1.

As described herein, note identification module 86 processes images 97 and identifies (i.e., recognizes) the plurality of physical notes in the images. The input image may be processed by note identification module 86 using marker and/or non-marker detection processes. Digital note generation module 88 generates digital notes 99 corresponding to the physical notes recognized within images 97. For example, each of digital notes 99 corresponds to one of the physical notes identified in an input image 97. During this process, digital note generation module 88 may update database 94 to include a record of the digital note, and may store within the database information (e.g., content) captured from boundaries of the physical note within the input image as detected by note identification module 86. Moreover, digital note generation module 88 may store within database 94 metadata associating the digital notes into one or more groups of digital notes.

Image communication module 90 controls communication of image data between mobile device 15 and external devices, such as cloud server 12, computer system 14, mobile device 16, or image capture device 18. In some examples, image communication modules 90 may, for example, allow a user to communicate processed or unprocessed images 97 of environments and/or digital notes and associated information extracted therefrom including metadata from database 68. In some examples, image communication module 90 exports this data to a zip file that may be communicated by FTP, HTTP, email, Bluetooth or other mechanism.

In the example of FIG. 1, note management application 78 includes user interface 98 that constructs and controls GUI 79 (FIG. 2). As described below, user interface 98 may, in some examples, output for display an input image 97 overlaid with the plurality of digital notes 99, where each of the digital notes is overlaid in place of a corresponding physical note. In addition, user interface 98 may display a group of digital notes 99 that has been designated by the user. This group of digital notes 99 may be, for example, a subset of the digital notes recognized in a particular input image 97. User interface 98 may display this designated group (set) of the digital notes on a second portion of GUI 79 and allow user 26 to easily add or remove digital notes 99 from the designated group.

In some example implementations, user interface 98 provides an image editor 96 that allows a user to edit the overlay image and/or the digital notes. In another example, digital note generation module 88 may include a process or processes that enhances the extracted information from the input image.

Additional example details of note management application 78 for detecting and recognizing physical notes are described in U.S. Patent Application 61/844,140, filed Jul. 9, 2013 entitled SYSTEMS AND METHODS FOR NOTE RECOGNITION AND MANAGEMENT USING COLOR CLASSIFICATION," U.S. Patent Application 61/844,152, filed Jul. 9, 2013, entitled "SYSTEMS AND METHODS FOR NOTE CONTENT EXTRACTION AND MANAGEMENT USING SEGMENTED NOTES, and U.S. Patent Application 61/844,176, filed Jul. 9, 2013, "SYSTEMS AND METHODS FOR NOTE CONTENT EXTRACTION AND MANAGEMENT BY SEGMENTING NOTES," the entire contents of each of which are incorporated herein by reference.

FIG. 4 is a flowchart illustrating an example of a note recognition process 100 as may be implemented by note management application 78 of mobile device 15. Initially, note identification module 86 of note management application 78 captures an input image of a plurality of notes through image acquisition (102). In some examples, the notes are physical notes, and it is more efficient to capture more than one note at a time. Next, note identification module 86 recognizes one of the plurality of notes from the input image (104). For example, note identification module 86 may recognize note features using a color detection module, a shape detection module, and a pattern detection module, and subsequently determine the general boundary of the note.

Digital note generation module 86 extracts content of the one of the plurality of notes to create sub-images (106). In some examples, digital note generation module 86 can apply image transformation to at least part of the input image before extracting content. In some other examples, digital note generation module 86 can apply image enhancement or another image processing technique, such as removing a background of the underlying workspace or changing the color of each note in the plurality of notes to improve the quality of the extracted content or sub-images (108). In yet other examples, digital note generation module 86 can further recognize text and figures from the extracted content or sub-images. Digital note generation module 86 stores the enhanced extracted content or sub-images to data storage 68 of mobile device 15, and may communicate the digital notes to cloud server 12 or other computer system 14 (110). At this time, the system may create a respective digital note representative of a corresponding one of the recognized physical notes. The system may associate the content extracted from the visual representation for a given physical note with the corresponding digital note representative of the physical note. Program code or other executable instructions for causing a programmable processor to perform process 100 may be stored within a computer-readable storage of mobile device 15.

FIG. 5 is a flow diagram illustrating an example of note recognition technique 120 in which note identification module 86 may use multiple detection modules to recognize notes and extract the content of notes. In some examples, the detection modules may include a color detection module, a shape detection module, and a pattern detection module. In one example, a color detection module may use color spaces such as the RGB (red, green, and blue), LAB (e.g., Hunter 1948 L,a,b color space, CIE 1976 (L*, a*, b*) color space), CMYK (cyan, magenta, yellow, and key (black)), HSV (hue, saturation, and value) etc. to identify regions of interest corresponding to the notes 125, 126, 127, 128 for color recognition 122. In other examples of the shape detection module and pattern detection modules, the notes 125, 126, 127, 128 are further distinguished in their shape and due to the presence of unique patterns detected by shape recognition algorithm 123 (e.g., Hough transform, shape context, etc.) and pattern recognition algorithm 124 (e.g., Support Vector Machine, cross-correlation, template matching, etc.), respectively. These algorithms 122, 123, 124 may help filter out unwanted objects in the input image or other sources of the content of notes 125, 126, 127, 128 and leave only those regions of interest corresponding to notes 125, 126, 127, 128. In another example, a computer system may be configured to execute any variation of technique 120. In another example, a non-transitory computer-readable medium including instructions for causing a programmable processor to execute may execute any variation of technique 120.

FIGS. 6A & 6B together are a flowchart illustrating another example of a note recognition process 130. Initially, process 130 captures input image, such as input image 24 of plurality of notes 22 of brainstorm session 20 through image acquisition as described in FIGS. 1-3 (132). In some examples, the notes are physical notes and it is more efficient to capture more than one note at a time. Next, process 130 recognizes from the input image one or more notes of plurality of notes 22 as described in FIG. 1, which the user, such as user 26 of FIG. 1, may select (134). For example, process 130 can recognize note features using a color detection module, a shape detection module, and a pattern detection module, and subsequently determine the boundary of the note as described in FIG. 5. Next, digital note generation module 86 extracts content of each note of plurality of notes 22 to create sub-images (136). In some examples, digital note generation module 86 can apply image transformation to at least part of the input image before extracting content (not shown in FIGS. 6A & 6B). In some other examples, digital note generation module 86 can apply image enhancement or other image processing technique, such as removing the background from the image of the workspace or enhancing pixel data (e.g., sharpening) associated with each of the digital notes to improve the quality of the extracted content or sub-images (136). In the example of FIG. 6B, digital note generation module 86 has, in response to user input, changed a digital note from green to white to provide increased readability (136). Program code or other executable instructions for causing a programmable processor to perform process 130 may be stored within a computer-readable storage of mobile device 15.

Digital note generation module 86 may further recognize text and figures from the extracted content or sub-images (not shown in FIGS. 6A & 6B). Digital note generation module 86 stores the enhanced extracted content or sub-images to data storage 68 of mobile device 15, and may subsequently communicate the original image data and/or digital notes including extracted information and metadata to cloud server 12 or computer system 14 as described in FIGS. 1-3 (138).

Figure 7A:
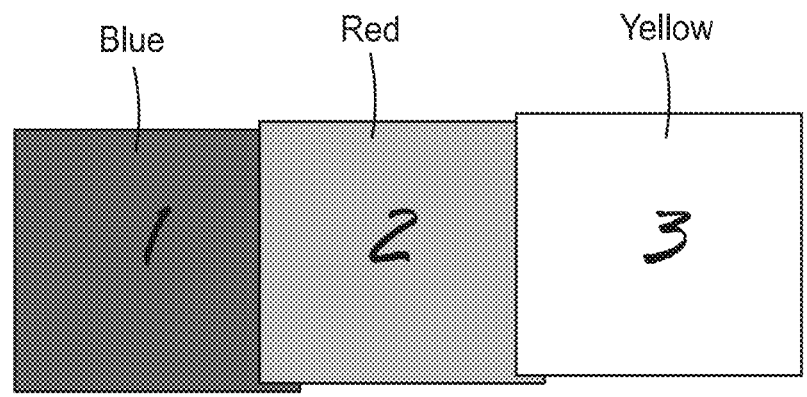
FIGS. 7A-7D are conceptual diagrams illustrating examples of notes that overlap the boundary of another note.
Figure 7B:
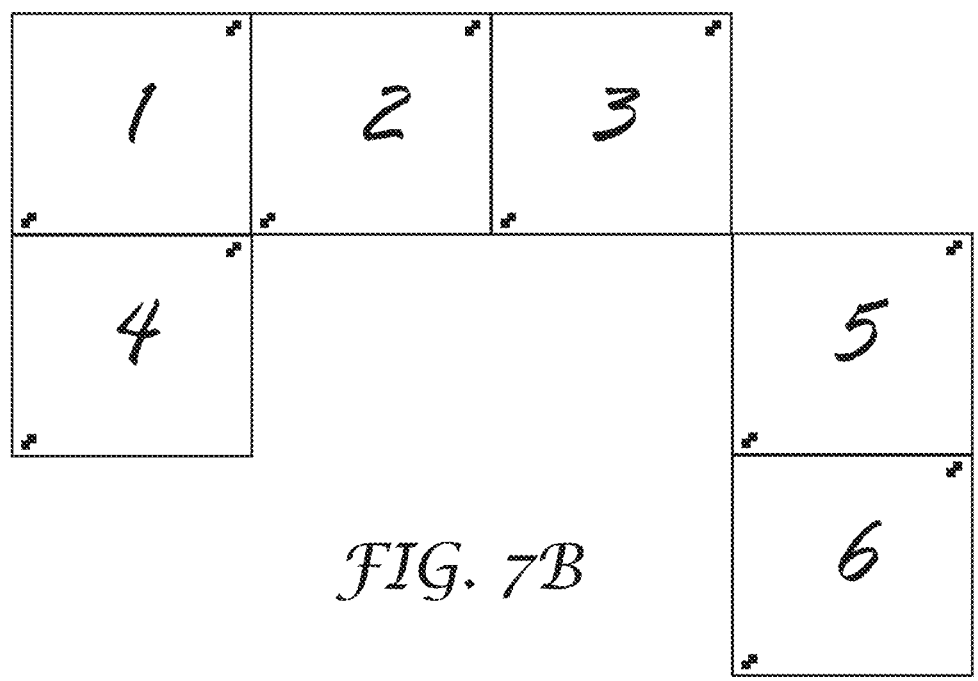
Figure 7C:
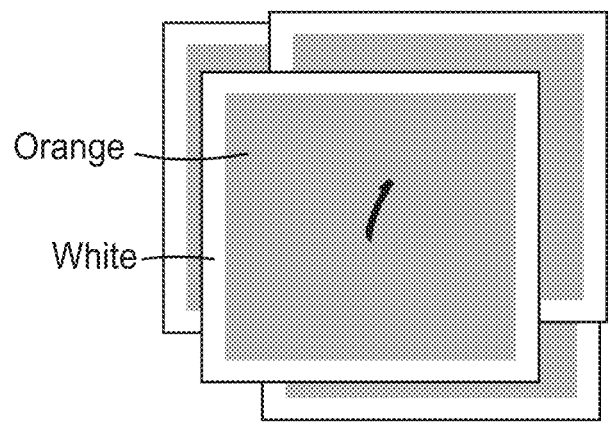
Figure 7D:
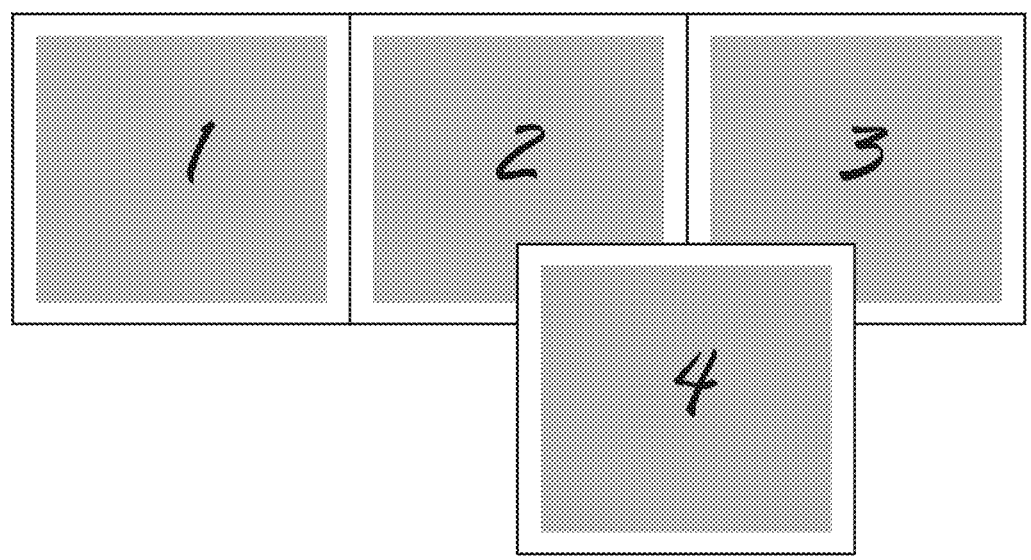

FIGS. 7A-7D are conceptual diagrams illustrating examples of at least one physical note that overlaps the boundary of another note. FIG. 7A is a conceptual diagram illustrating an example of a plurality of adjacent notes 22 of different colors on a workspace 20 that overlap, as described with respect to FIG. 1. FIG. 7B is a conceptual diagram illustrating an example of a plurality of notes 22 of one color including markings at the upper-right and lower-left corners of each note on a workspace 20 that overlap, as described with respect to FIG. 1. FIG. 7C is a conceptual diagram illustrating an example of a plurality of notes 22 in a stacked overlapping relationship, each of notes 22 having one color for the body and another color for the border, on a workspace 20 as described with respect to FIG. 1. FIG. 7D is a conceptual diagram illustrating another example of a plurality of adjacent notes 22 that overlap the boundary of another one or more of notes 22, as described with respect to FIG. 1. FIGS. 7A-7D illustrate some examples of overlapping notes. However, notes 22 could be used in other combinations to create other examples of overlapping notes.

As further described below, physical notes having borders that are different in color from the body of the notes provide a form of a fiducial mark that may be used for color segmentation and detection of the physical notes. As fiducial marks, in some examples, the border color may be selected to provide good color separation from the background color, such as a white or black border color that is different from the background (body) color of the note. As further examples, the border color and the body color may be selected to be complementary colors so as to provide good color separation, such as use of cyan borders or other fiducial marks on a yellow note, thereby providing high color contrast to facilitate identification of the physical note.

In other examples, fiducial marks may be constructed using an invisible ink that may only be visible to the image processing engine. As another example, retro-reflective material may be used on the notes as a fiducial mark that may be responsive to a flash from the imaging device.

Figure 8A:
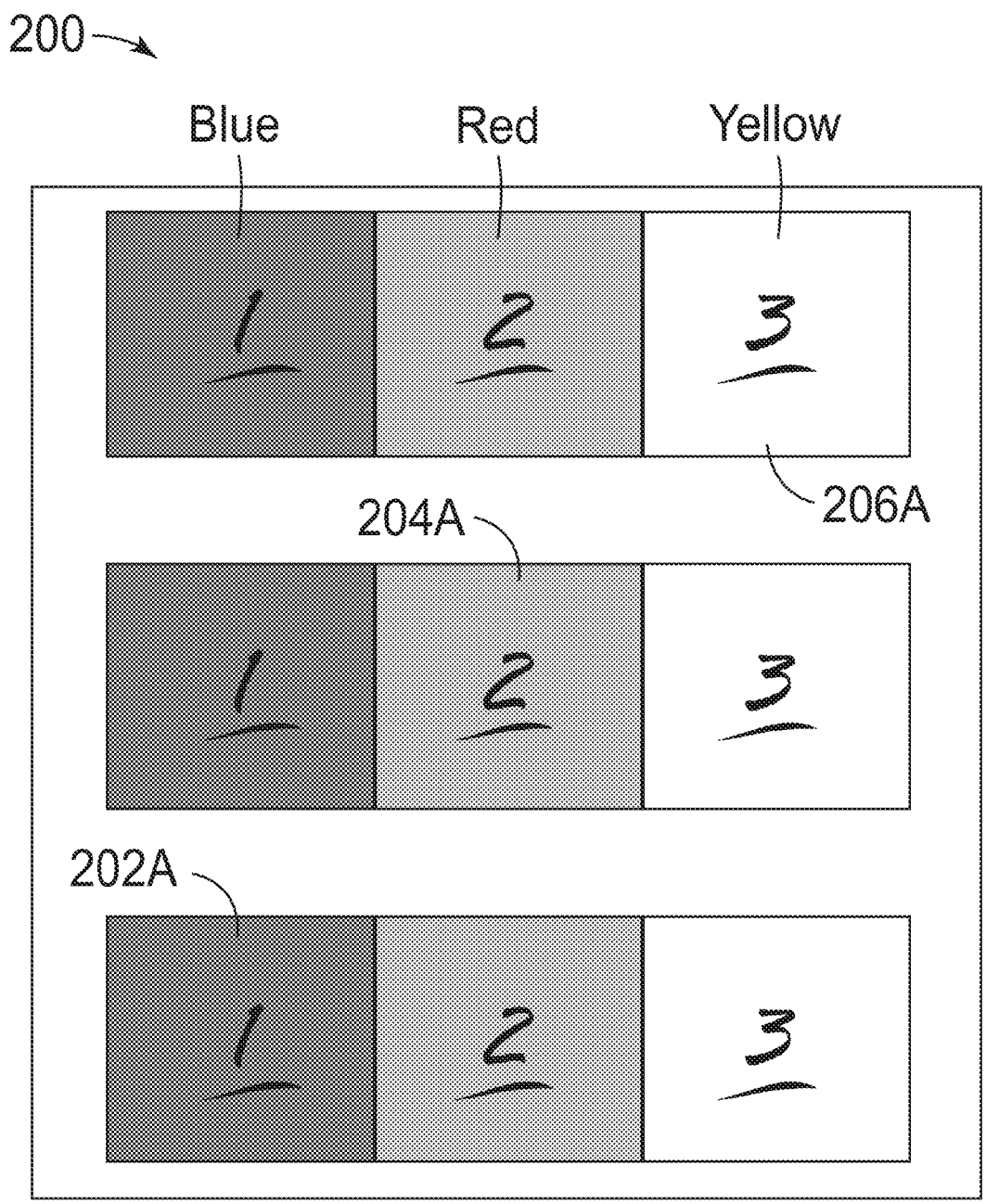
FIGS. 8A & 8B are conceptual diagrams illustrating an example of a technique for detecting and segmenting overlapping notes based on different colors in the overlapping notes and extracting a set of content as note segments.

FIG. 8A is a conceptual diagram illustrating an example technique 200 for detecting and segmenting overlapping and/or adjacent notes by using color classification algorithms. In some cases, the input image is retrieved from a visual representation (not shown in FIG. 8A) if the visual representation is not a single image. For example, the visual representation is a set of images, and the input image retrieved is an aggregation of at least part of the set of images. As another example, the visual representation is a video, and the input image retrieved is a combination of several or all frames of the video.

Upon receiving the input image as described in FIGS. 1-3, note management application 78 executing on mobile device 15, cloud server 12, or computer system 14, identifies a plurality of overlapping physical notes by using a color detection module, which may be a component of note identification module 86. The color detection module may convert the input image to a desirable color space (not shown in FIG. 8A). An example applicable color space includes, but not limited to, RGB (red, green, and blue), LAB (e.g., Hunter 1948 L,a,b color space, CIE 1976 (L*, a*, b*) color space), CMYK (cyan, magenta, yellow, and key (black)), HSV (hue, saturation, and value), HSL (hue, saturation, and lightness), HSI (hue, saturation, and intensity), sRGB (standard red, green, and blue) color space. Next, the color detection module may apply one or more classification functions to color values for each pixel in the input image (not shown in FIG. 8A). The classification functions can be computed using optional training steps. The classification algorithms for the color detection module can be, for example, linear discriminant analysis, quadratic classifier, Gaussian Mixture Models, Boosted Decision Trees, Support Vector Machines or the like.

Some classifiers are generative in nature while others are discriminative. In general, generative classifiers generate an individual model for each class (in our case a color) and a queried pixel/group of pixels value is given a probability score as to whether it belongs to that class or not. Discriminative classifiers on the other hand model the boundary between two or more classes (2-class and multiclass classification respectively). Generative models provide easier generalizability to new classes (colors) that are not already modeled while separate discriminative models have to be retrained to every existing class (colors). Many examples of generative and discriminative classifiers are described in Christopher M. Bishop, 2006, Pattern Recognition and Machine Learning (Information Science and Statistics), Springer-Verlag New York, Inc., Secaucus, N.J., USA, the entire content of which is incorporated herein by reference. Some examples of generative models are naïve Bayes classifier, Gaussian Mixture Models and other probabilistic Bayesian models using Gaussian or other priors, and Dictionary Learning, such as those described in Michal Aharon, Michael Elad, and Alfred Bruckstein (2006), "K-SVD: An Algorithm for Designing Overcomplete Dictionaries for Sparse Representation", IEEE Transactions on Signal Processing 54 (11): 4311-4322), the entire content of which is incorporated herein by reference. Some examples of discriminative classification models are neural networks, Support Vector Machines, Decision Trees, Linear and Quadratic discriminate classification, logistic regression. Other example classification methods are neither generative nor discriminative e.g. nearest neighbor classification algorithm. In addition, the performance of any of the above mentioned classification models can be improved by ensemble learning algorithms that combine multiple instances of classification models mentioned above. Ensemble learning may be implemented as Bagging, Boosting, and their variants.

Using the classification algorithms, indicators indicative of color classes for each pixel in the image (not shown in FIG. 8A) are generated. A color class includes a particular range of wavelength or can be an "other" color class referring to any other color besides the color classes of interest. For example, a color class can be magenta, yellow, blue, orange, etc. An indicator can be represented by, for example, a number, a code, a symbol, an alphanumerical token, a color value, a grayscale value, or the like. In another example, technique 200 may also use a shape detection module and a pattern detection module as described in FIG. 5.

Figure 8B:
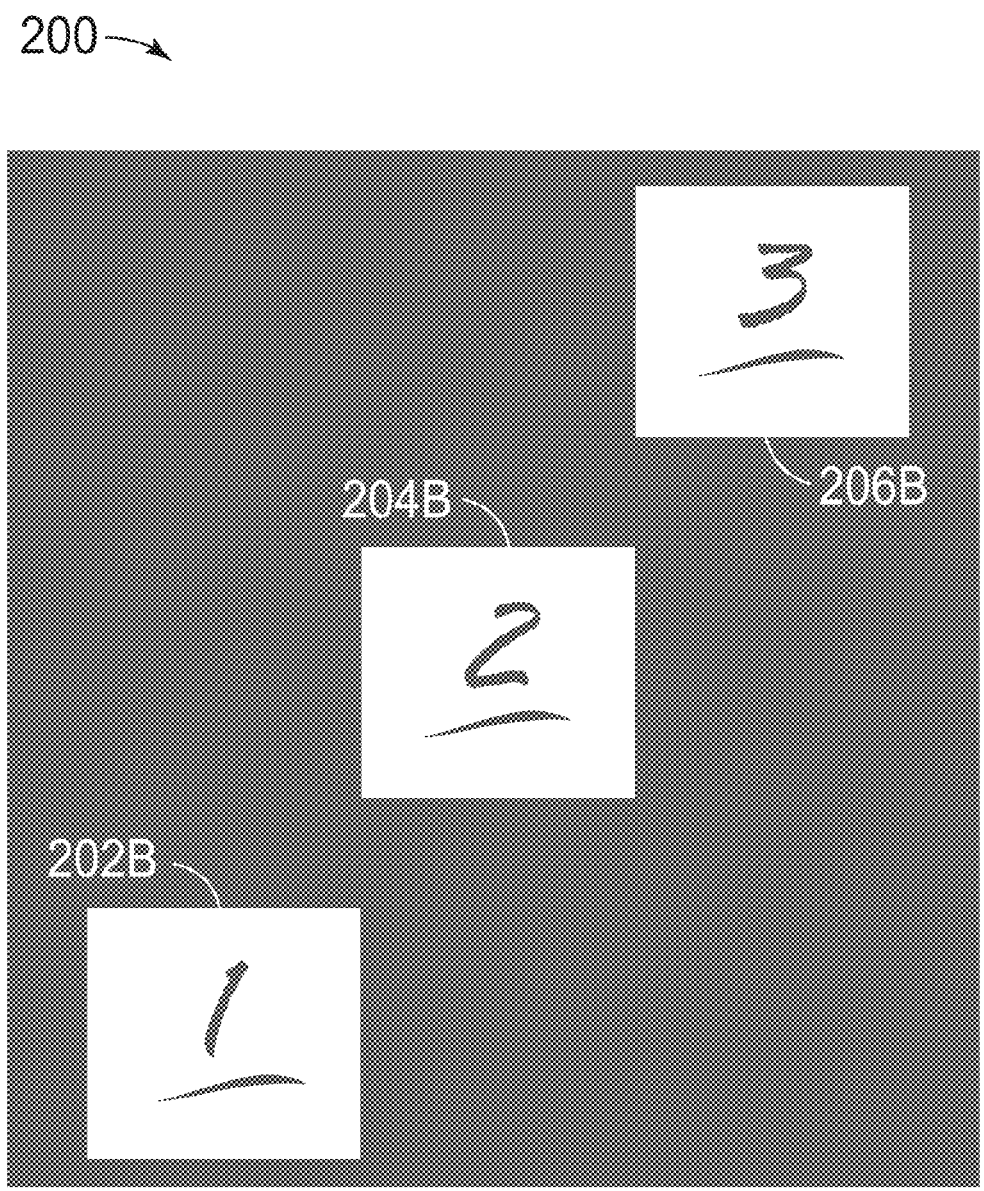

FIG. 8B is a conceptual diagram illustrating an example of technique 200 where based on the indicators, the boundary of note(s) 202B, 204B, 206B or note segment(s) can be determined. In one example, the adjacent pixels with a same indicator are grouped into a region and the boundary of the region can be determined. In some cases, the indicators are further processed using image processing principles, for example, noise filtering, morphological opening, or the like, before the boundary is determined. In some examples, the shape and/or the size of a note or note segment is predetermined, which can be used to determine and/or filter the general boundary of note(s) 202B, 204B, 206B or note segment(s). Using the boundaries, the content of the note(s) 202B, 204B, 206B or note segment(s) can be segmented and extracted to generate segmented digital notes. In another example, technique 200 may also display the input image including the plurality of segmented digital notes in place of the plurality of overlapping notes on a first portion of a graphical user interface and the plurality of digital notes on a second portion of the graphical user interface.

Figure 9A:
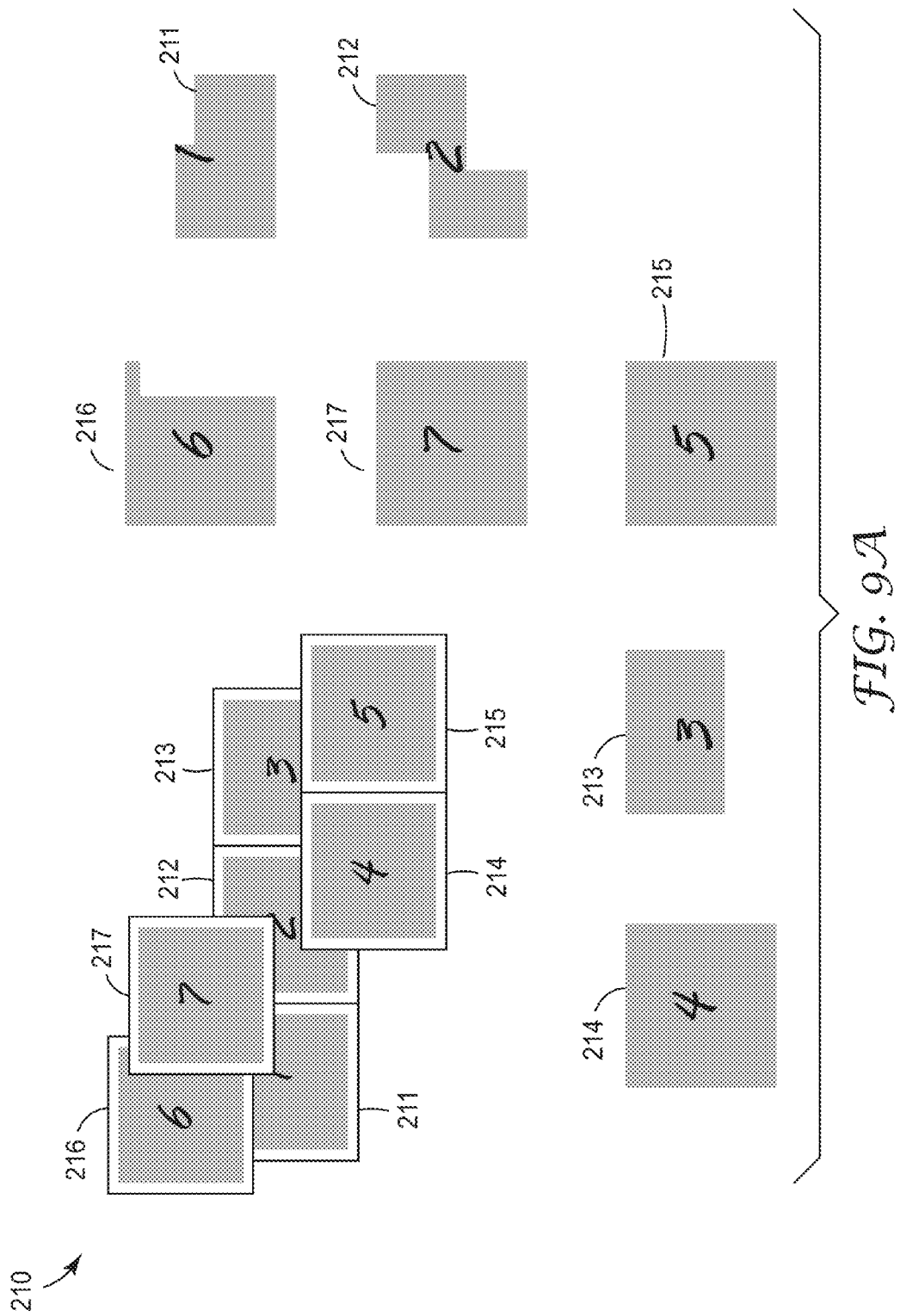
FIGS. 9A & 9B are conceptual diagrams illustrating another example of a technique for detecting and segmenting overlapping notes based on different colors in the overlapping notes and extracting a set of content as note segments.
Figure 9B:
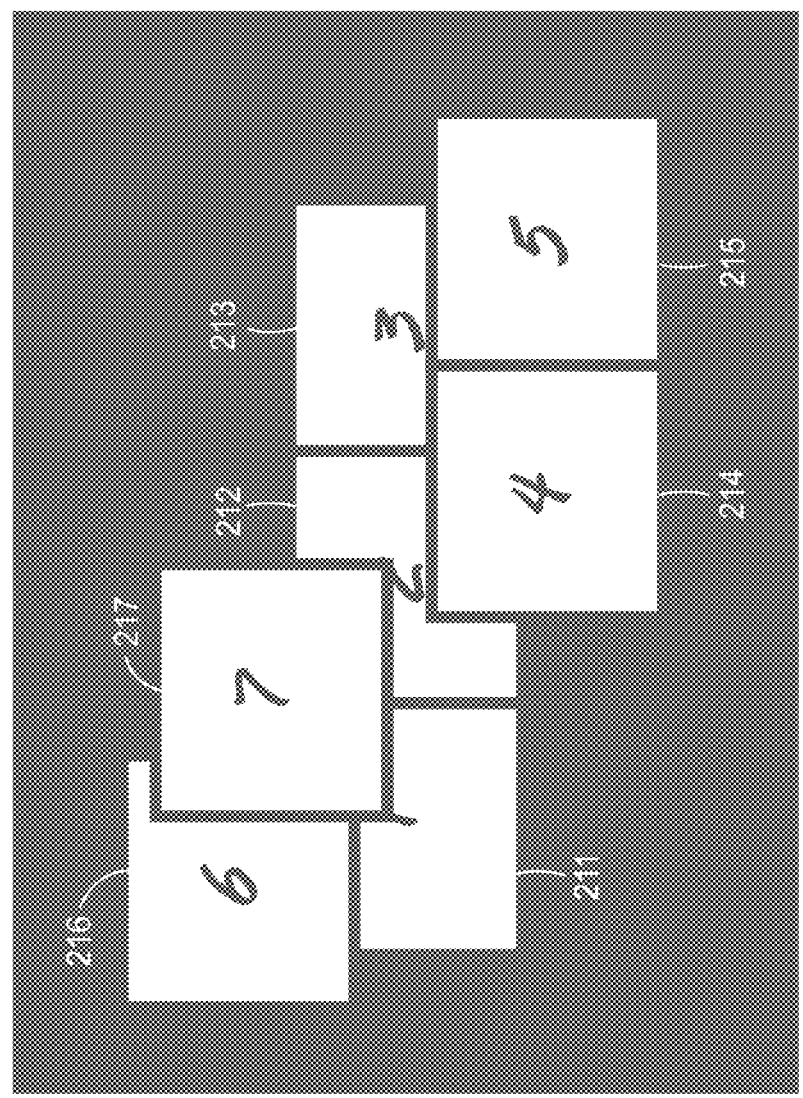

FIGS. 9A & 9B are conceptual diagrams illustrating another example of technique 200 as technique 210 where note(s) 211-217 or note segment(s) overlap and have colored boundaries, borders, or colored mark(s) at one or more locations instead of having a solid color. In one example of technique 210, a color detection module as described in FIG. 8A can be used to identify the boundaries, borders, or marks (as shown in FIG. 9B) and further extract the content of the note(s) 211-217 or note segment(s) (as shown in FIG. 9A).

Figure 10:
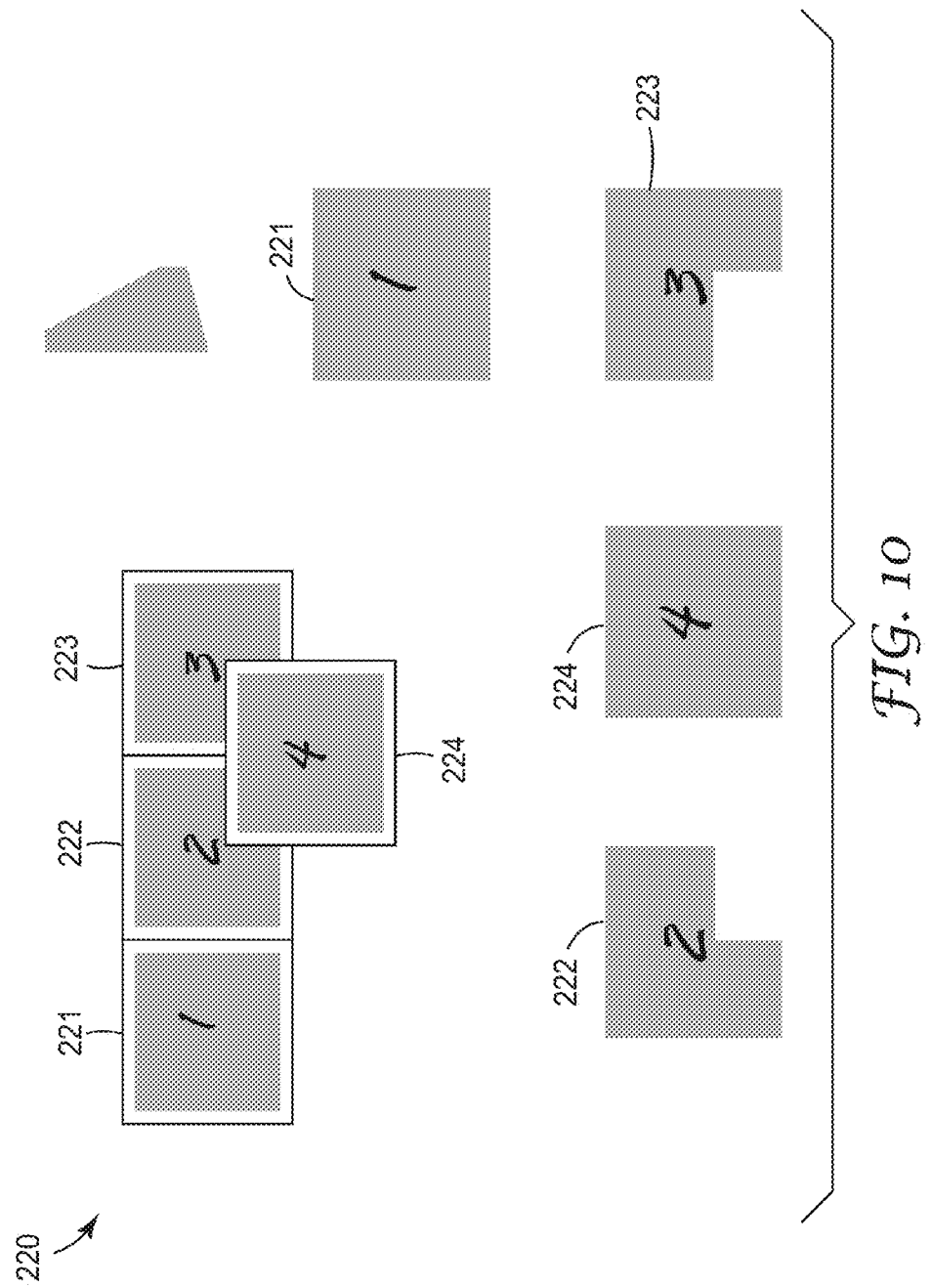
FIG. 10 is a conceptual diagram illustrating another example of a technique for detecting and segmenting overlapping notes based on different colors in the overlapping notes and extracting a set of content as note segments.

FIG. 10 is a conceptual diagram illustrating another example of technique 200 as technique 220 where note(s) 221-224 or note segment(s) overlap and have colored boundaries, borders, or colored mark(s) at one or more locations instead of having solid color. In one example of technique 220, a color detection module as described in FIG. 8A can be used to identify the boundaries, borders, or marks (as shown in FIG. 10) and further extract the content of the note(s) 222-224 or note segment(s) (as shown in FIG. 10).

Figure 11:
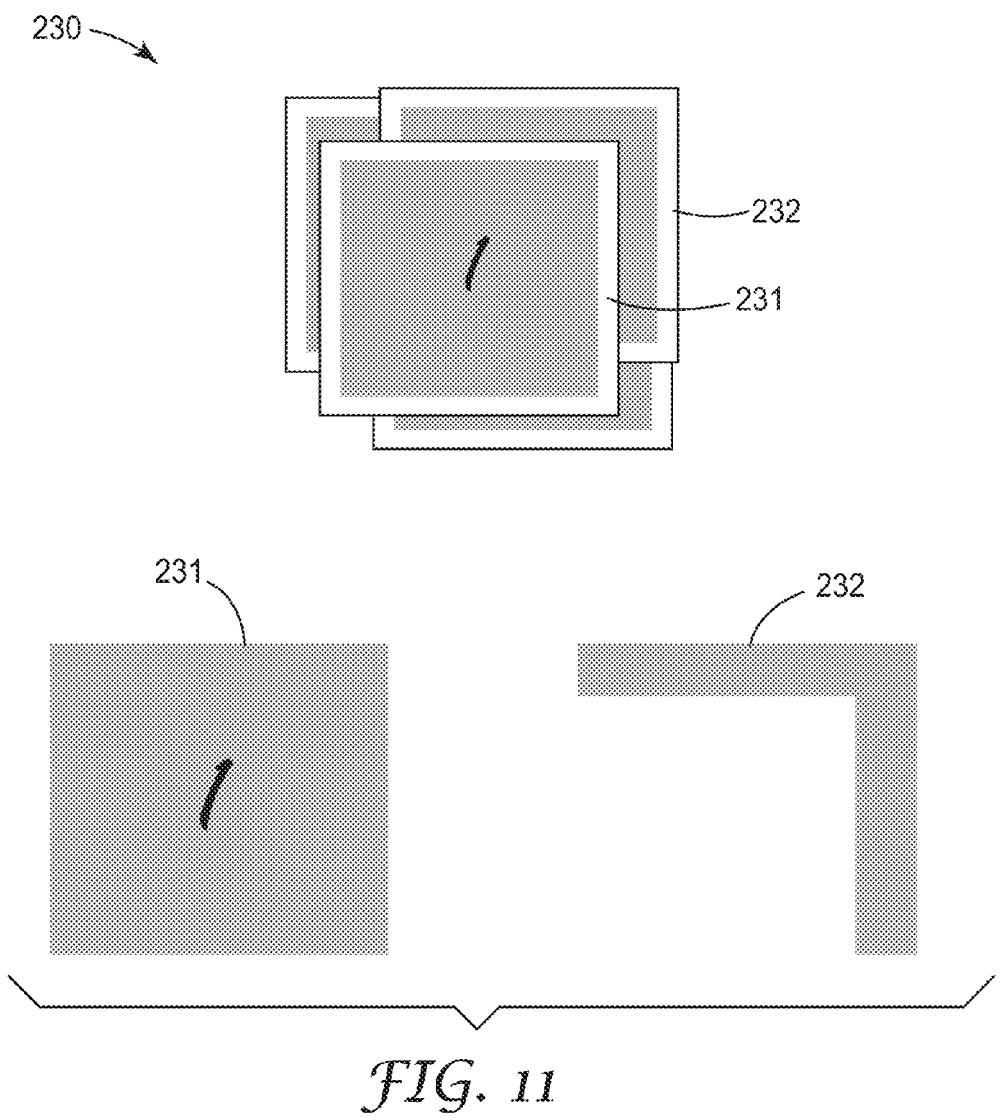
FIG. 11 is a conceptual diagram illustrating another example of a technique for detecting and segmenting overlapping notes based on different colors in the overlapping notes and extracting a set of content as note segments.

FIG. 11 is a conceptual diagram illustrating another example of technique 200 as technique 230 where note(s) 231, 232 or note segment(s) overlap and have colored boundaries, borders, or colored mark(s) at one or more locations instead of having a solid color. In one example of technique 230, a color detection module as described in FIG. 8A can be used to identify the boundaries, borders, or marks (as shown in FIG. 11) and further extract the content of the note(s) 231, 232 or note segment(s) (as shown in FIG. 11).

In another example, a computer system may be configured to execute any variation of techniques 200, 210, 220, 230. In another example, a non-transitory computer-readable medium including instructions that cause a programmable processor to execute may execute any variation of techniques 200, 210, 220, 230.

Figure 12A:
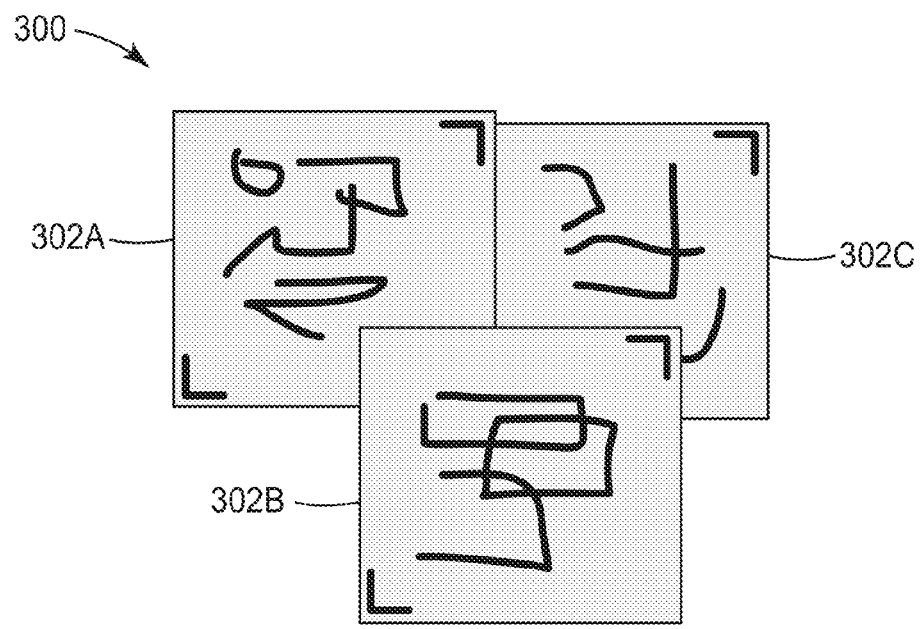
FIGS. 12A-12F and 13 are conceptual diagrams illustrating example aspects of an example technique for segmenting a plurality of overlapping notes when the notes are the same color and extracting a set of content as note segments.
Figure 12B:
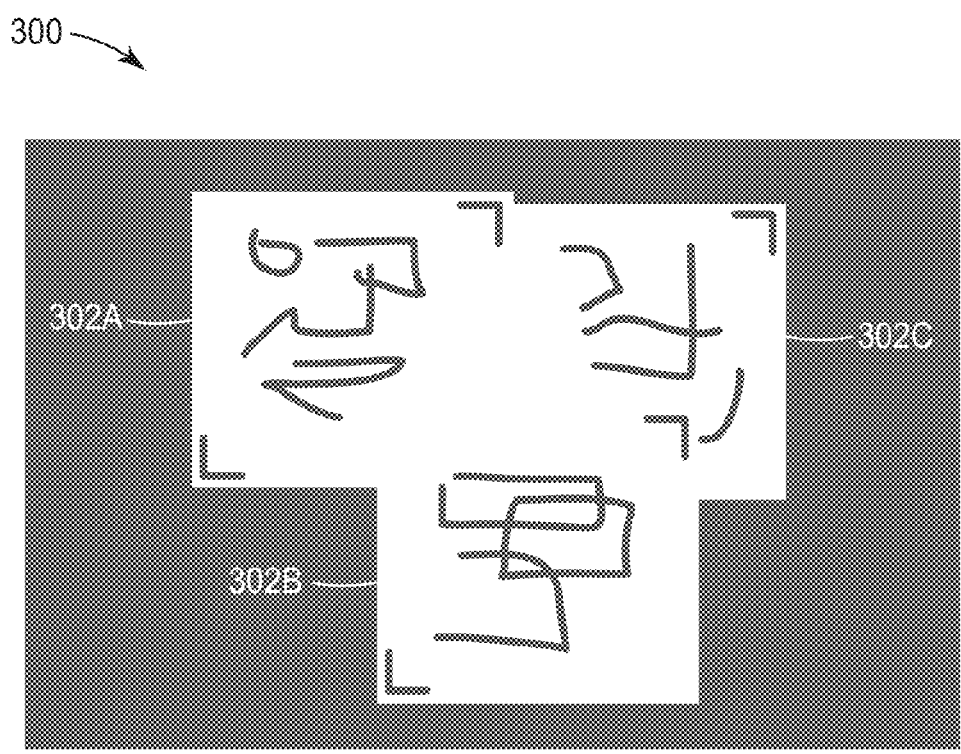
Figure 12C:
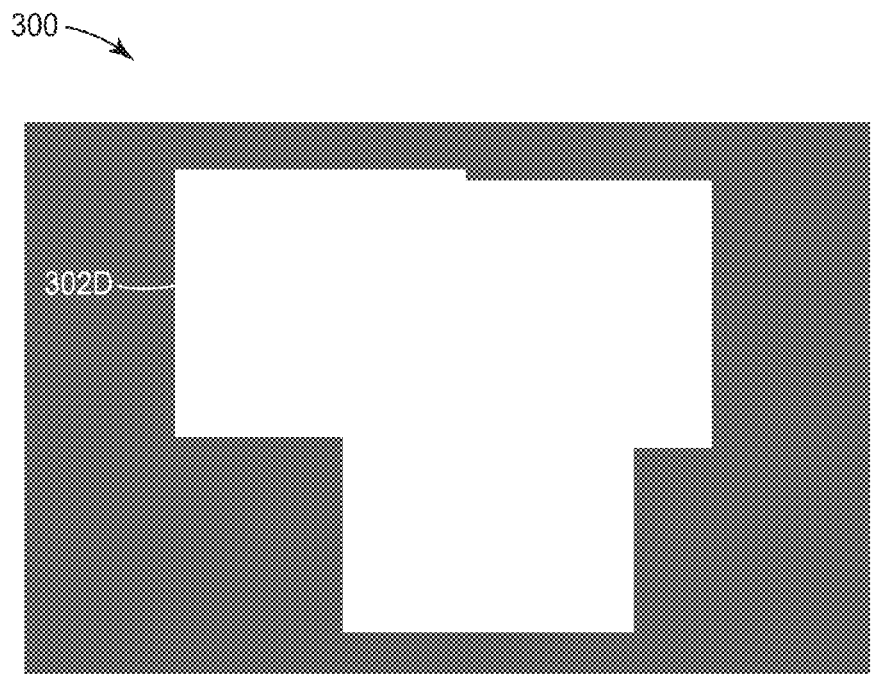
Figure 12D:
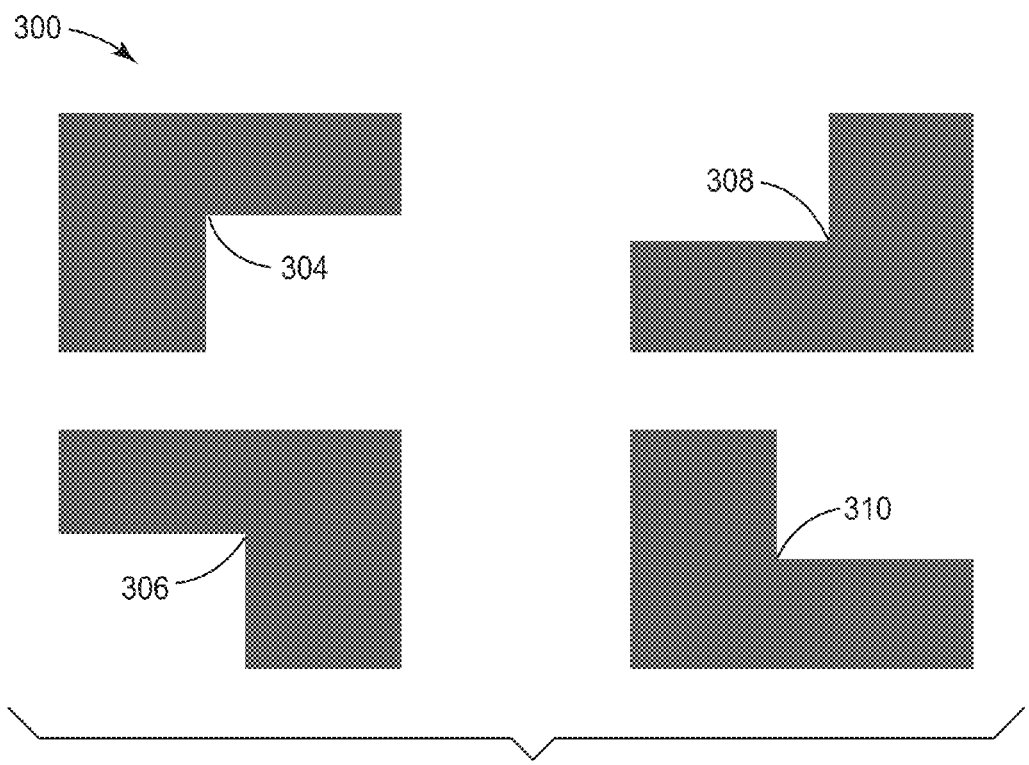
Figure 12E:
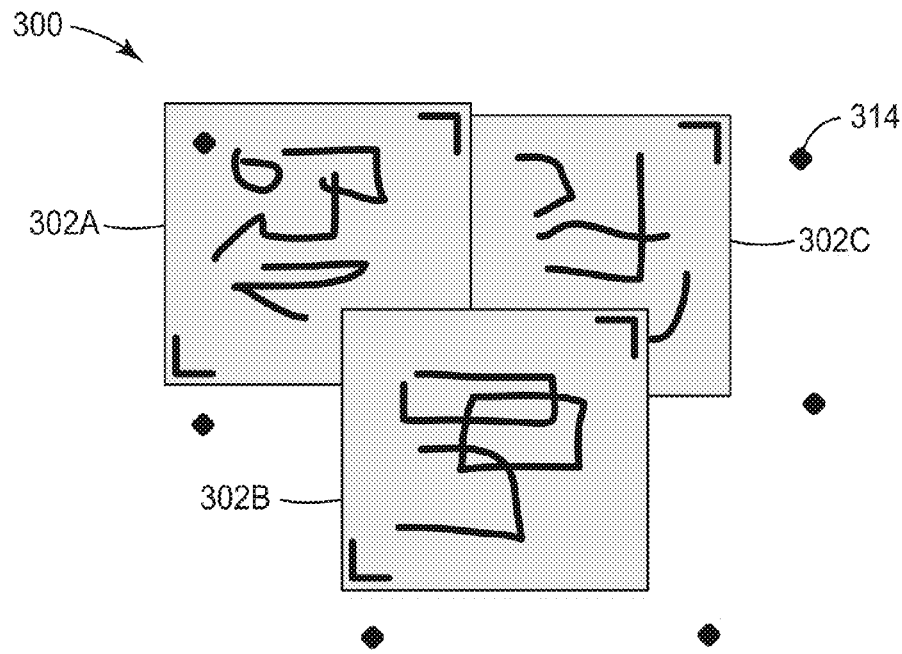
Figure 12F:
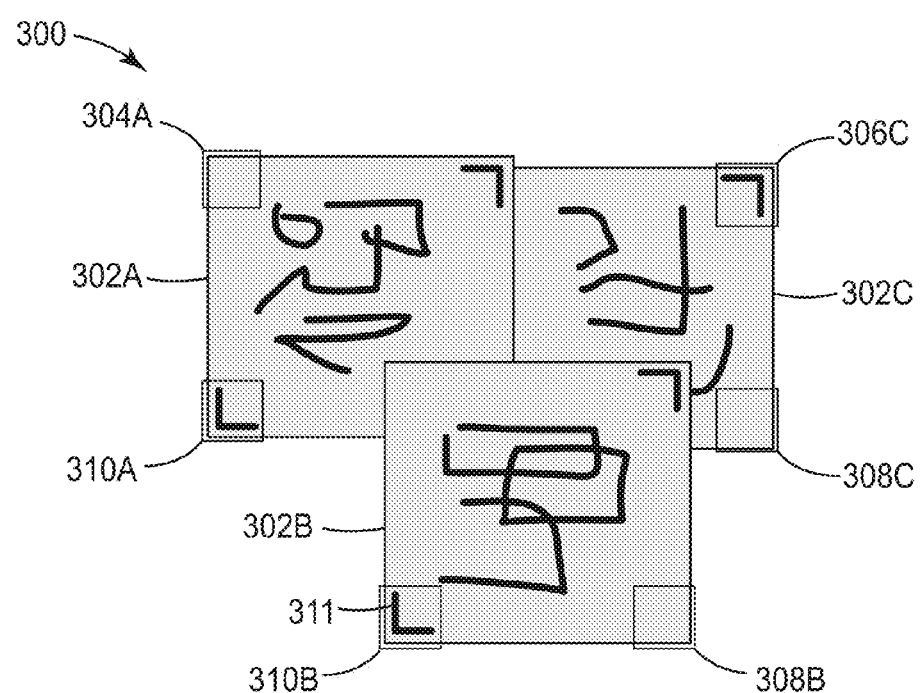
Figure 13:
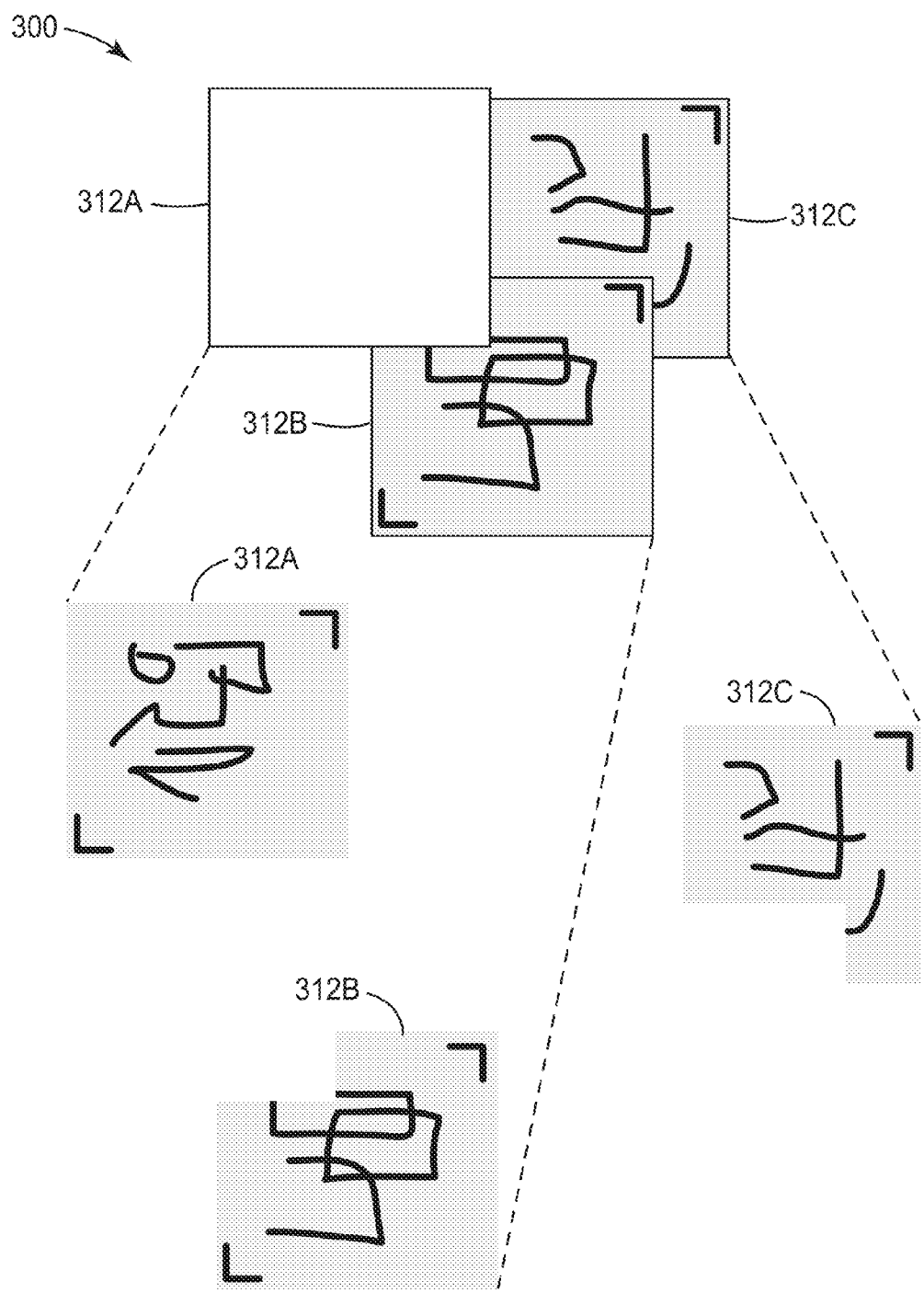
Figure 14:
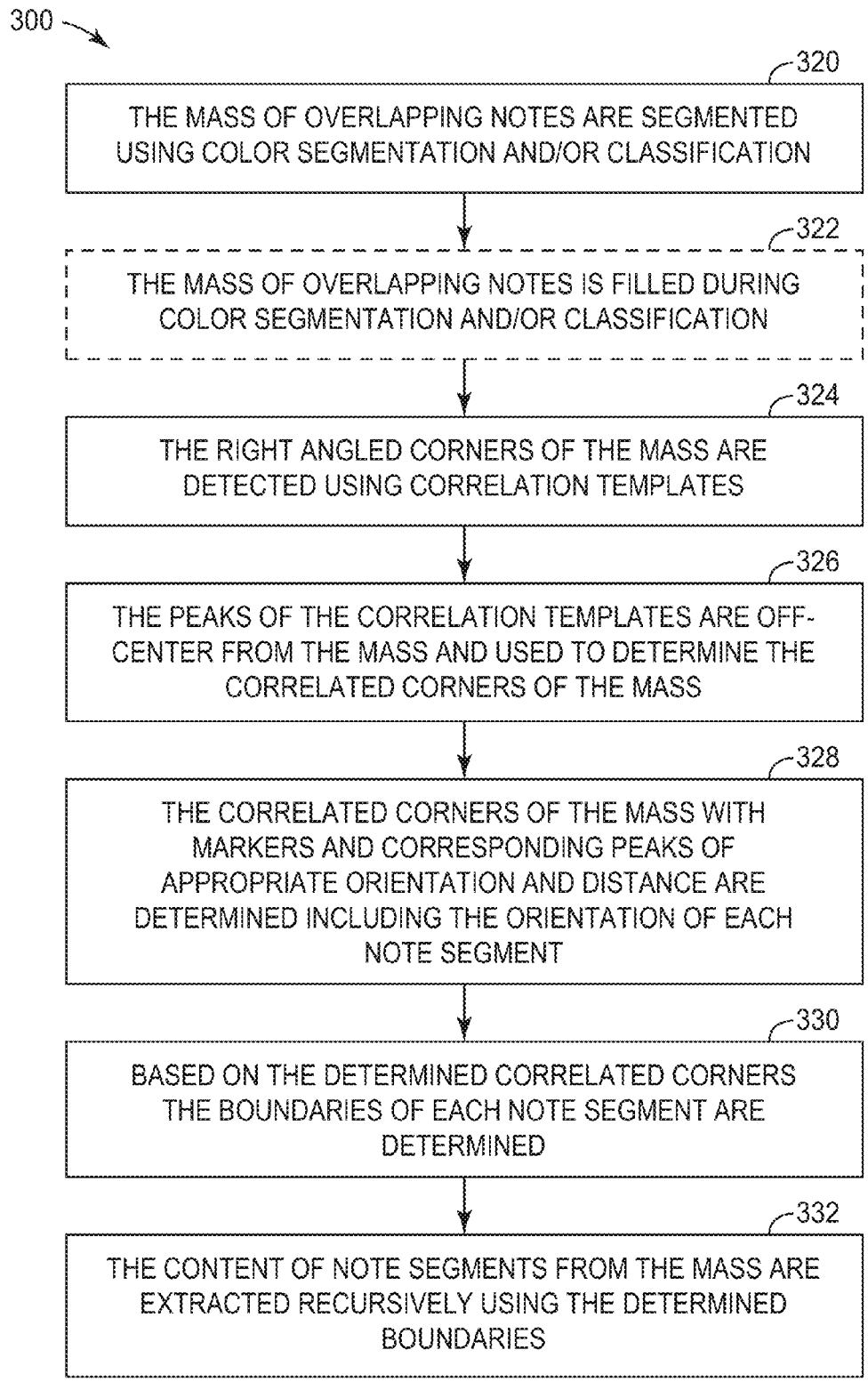
FIG. 14 is a flowchart illustrating the example technique illustrated by FIGS. 12A-12F and 13.

FIGS. 12A-12F and 13 are conceptual diagrams illustrating example aspects of an example technique 300 for segmenting a plurality of overlapping notes when the notes are the same color and extracting a set of content for the note segments, and FIG. 14 is a flowchart illustrating example technique 300. Upon receiving the input image as described in FIGS. 1-3, cloud server 12, computer system 14, mobile devices 15, 16, and/or image processing engine 82 identifies a mass of the plurality of overlapping notes 302A-302C and determines whether the overlapping notes 302A-302C are the same color.

In FIG. 12A overlapping notes 302A-302C are the same color and are segmented using a color detection module as described in FIG. 8A and as shown in FIG. 12B (320 of FIG. 14). Optionally, the mass of plurality of overlapping notes 302A-302C may be filled during the color detection module analysis as shown as mass 302D in FIG. 12C (322 of FIG. 14). The right-angled corners of the mass of plurality of notes 302A-302C are detected using correlation templates 304, 306, 308, 310 (324 of FIG. 14). The peaks 314 of the correlation templates 304, 306, 308, 310 are located off-center and are used to determine the corners of the mass of plurality of notes 302A-302C as shown in FIG. 12E (326 of FIG. 14). The corners of the mass of plurality of notes 302A-302C with marks 311 applied to one or more corners along at least a part of the boundary and have corresponding correlation peaks are used to determine the correlated corners 304A, 310A, 310B, 308B, 308C, and 306C and the orientation of each note in the mass of plurality of notes 302A-302C as shown in FIG. 12F (328 of FIG. 14). In another example, the technique 300 may optionally include performing geometric correction and cropping techniques to the mass of plurality of notes 302A-302C based on the orientation of each note in the mass of plurality of notes 302A-302C. In another example, the marks can be a different color border, such as a white border, along the boundary of the note. In another example, technique 300 may further include determining whether at least one of the plurality of notes in the input image includes one or more marks 311 in the mass of plurality of notes 302A-302C by comparing one or more marks 311 to marks in a database.

In FIGS. 12A-12F and FIG. 13 the input image does contain one or more marks 311, so technique 300 may include utilizing a marker detection module with the color detection module to determine the boundary of each note segment. In FIG. 13, based on the correlated corners 304A, 310A, 310B, 308B, 308C, and 306C, the boundaries of segments 312A-312C of the mass can be determined (330 of FIG. 14). In some cases, the marker detection module can determine the relative positions of marks 311, which can be used to determine the boundaries of the plurality of note segments 312A-312C. The content of note segments 312A-312C of the mass can extracted from the plurality of note segments 312A-312C using the determined boundaries (332 of FIG. 14). In some cases, each piece of content is extracted from a corresponding note segment. In another example, the extracted contents of note segments 312A-312C are used to generate a plurality of digital notes corresponding to the boundary of each note in the plurality of overlapping notes identified in the input image, and the plurality of digital notes include information represented by the plurality of note segments 312A-312C in the input image. In another example, the extracted contents of note segments 312A-312C are used to generate a plurality of segmented digital notes corresponding to the boundary of each note in the plurality of overlapping notes identified in the input image, and the plurality of segmented digital notes include information represented by the plurality of note segments 312A-312C in the input image. In this way, the system may create one or more respective digital note representative of a corresponding one of the recognized physical notes. As one example, a record may be created to contain a plurality of database fields, including fields for storing the particular content of each color segment of the physical note. The system may associate the content extracted from the visual representation for a given physical note with the corresponding digital note representative of the physical note. Moreover, the system may associate the content piece extracted from each color segment with the digital representation of each color segment. For example, the system may update the fields for the respective record within the database to store respective ones of the content pieces for the different notes or segments.

FIGS. 15 & 16 illustrate an example graphical user interface 400 presented by note management application 18. In this example, graphical user interface 400 includes a marker detection control 402, 406 that selectively allows the user to enable or disable mark-based note detection modules or non-marker-based detection modules.

In one example, as illustrated in FIG. 15, a user, such as user 26 of FIG. 1, activates marker detection control 402 before directing note management application 18 to capture or otherwise process an input image. By activating marker detection toggle 402 to utilize a marker detection module, user 26 directs image processing engine 82 of note management application 78 to segment a plurality of detected overlapping physical notes based on fiducial markers associated with the notes. The user may activate a marker detection control 402 prior capturing the input image of the workspace or may activate marker detection control 402 after the workspace is captured but prior to a processing of the input image to utilize a marker detection module to segment the plurality of overlapping notes based on fiducial markers. In this example, the note in the input image contains mark 404, which can be a barcode, a color code, a color, a matrix code, a color block, a different color border, or the like.

In general, the marker detection module uses one or more marks 404 to determine the boundary of the note. In some cases, the note may be slanted in the input image (not shown in FIGS. 15 & 16). In some other cases, the input image may be taken with geometric distortion. The marker detection module may use the determined boundary of mark 404 or a portion of mark 404 to determine the necessary image transformation and correction to the input image to obtain the content of the note.

In another case, as illustrated in FIG. 16, the user may elect to disable marker detection control 406 to not include a marker detection module in the note recognition technique. In response, image processing engine 82 of note management module 78 may invoke any one or more non-marker-based note detection algorithms such as identifying the plurality of physical notes based on shapes defined by perimeters of the plurality of notes in the input image, identifying the plurality of notes according to color spaces associated with background colors of the plurality of notes, and/or identifying the plurality of notes according to a pattern recognition algorithm.

For purposes of example, marker detection control 402, 406 is shown as a toggle UI element having an on state and an off state, although other UI elements could be used, such as radio buttons, drop down lists and the like.

Figure 18:
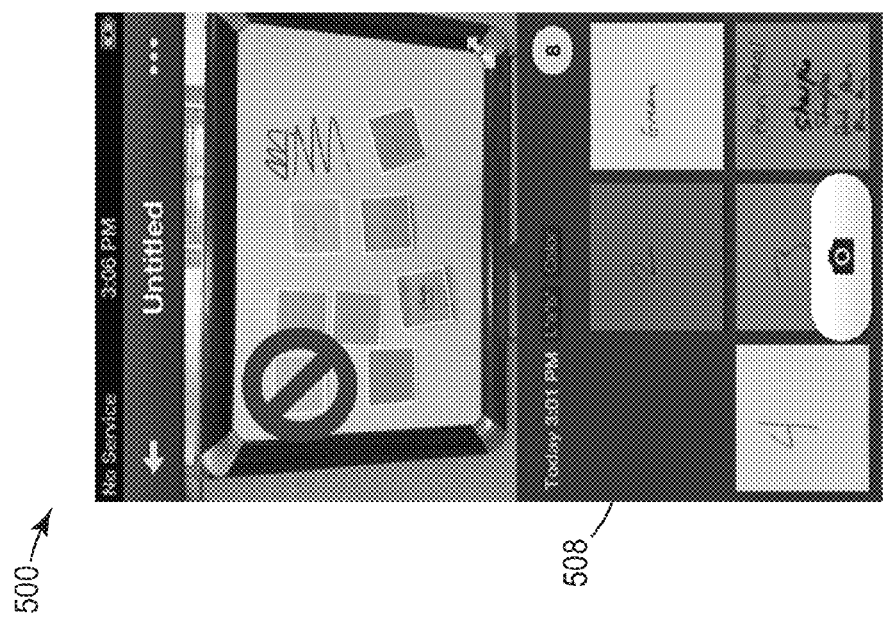
FIGS. 17 & 18 illustrate an example of selecting and removing a digital note from one or more portions of a graphical user interface.
Figure 17:
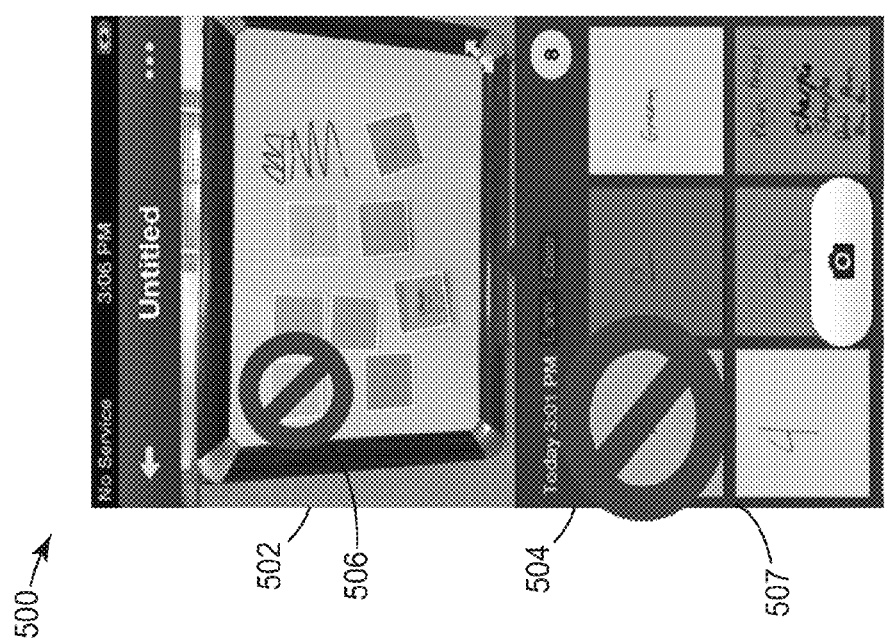

FIGS. 17 & 18 illustrate an example in which note management application 78 of mobile device 15 provides functionality by which user 26 manages a set of digital notes associated with a workspace, such as workspace 20 of FIG. 1. For example, note management application 78 generates GUI 79 to include input controls that allow user 26 to selectively include or exclude notes recognized in an input image, thereby controlling which of the physical notes have corresponding digital notes in a set or group of digital notes.

In the example illustrated by FIG. 17, a mobile device includes a graphical user interface 500 with a first portion (region) 502 and a second portion (region) 504. Note management application 78 displays within first portion 502 of graphical user interface 500 the input image captured from a workspace, where the input image typically provides a visual representation of a workspace having a plurality of physical notes. Note management application 78 displays within second portion 504 a set of digital images generated from the physical notes within the input image as recognized by note management application 78.

In addition, note management application 78 may display, on the first portion 502 of graphical user interface 500, the digital notes and enhanced sub-images associated therewith overlaid on the original input image, where each of the plurality of digital notes is presented in place of the corresponding physical note recognized by the note management application. This may, for example, aid the user in associating the digital notes with their respect physical notes in the workspace.

Each note in the plurality of digital notes on first portion 502 and second portion 504 of the graphical user interface may be selected 506, 507 by a user input for deletion from the set of digital notes. As illustrated between FIGS. 17 & 18, the selected digital note 506, 507 in the second portion of the graphical user interface may be deleted 508 from the second portion of the graphical user interface and remain in the first portion of the graphical user interface. In another example, the selected digital note 506, 507 may be deleted from both the first portion and the second portion of the graphical user interface. In another example, the selected digital note 506, 507 may be deleted from the first portion of the graphical user interface and remain in the second portion of the graphical user interface.

Figure 20:
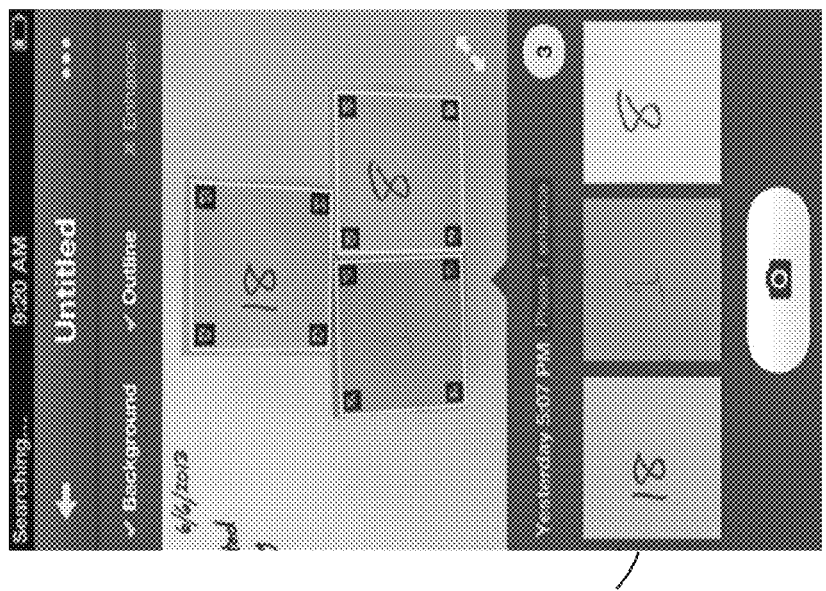
FIGS. 19 & 20 illustrate an example of selecting and adding a digital note from one portion of the graphical user interface to a second portion of the graphical user interface.
Figure 19:
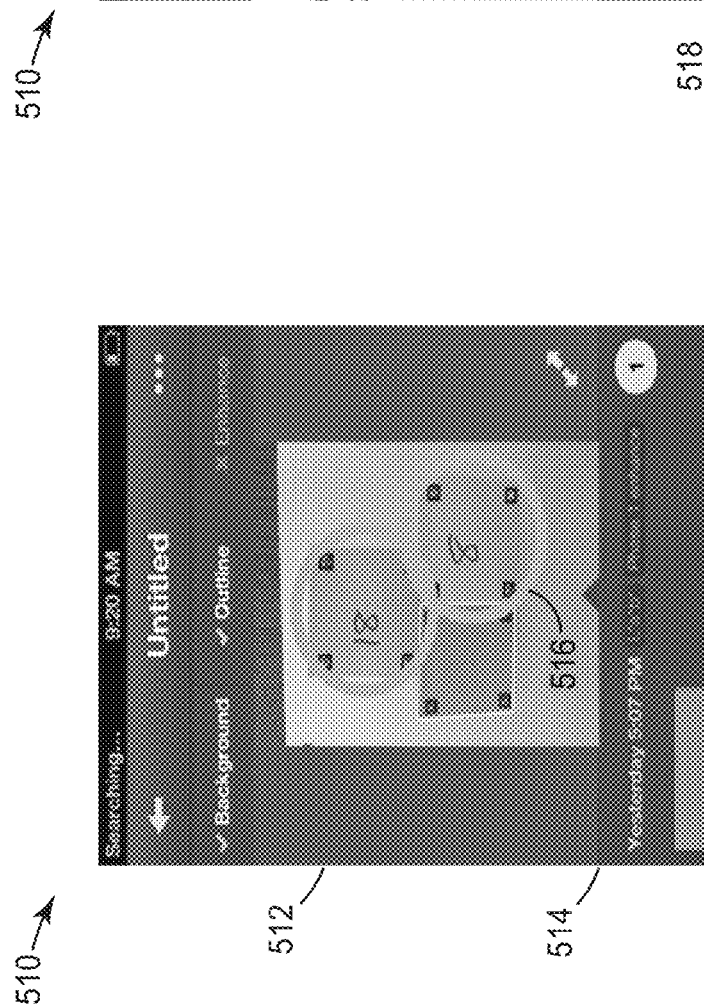

FIGS. 19 & 20 illustrate example user interfaces 510 with a first portion (region) 512 and a second portion (region) 514 presented by mobile device 15 that allow a user to select and add a digital note for inclusion within a set of digital notes created from physical notes recognized from a given workspace. As illustrated between FIGS. 19 & 20, digital notes 516 selected in the first portion 512 of the graphical user interface may be added to the set of digital notes 518 presented in the second portion 514 of the graphical user interface. In other words, the user may select one or more of the digital notes overlaid on the image of the workspace and indicate that the notes are to be included in a particular set of digital notes presented in the second portion of the graphical user interface.

Figure 21:
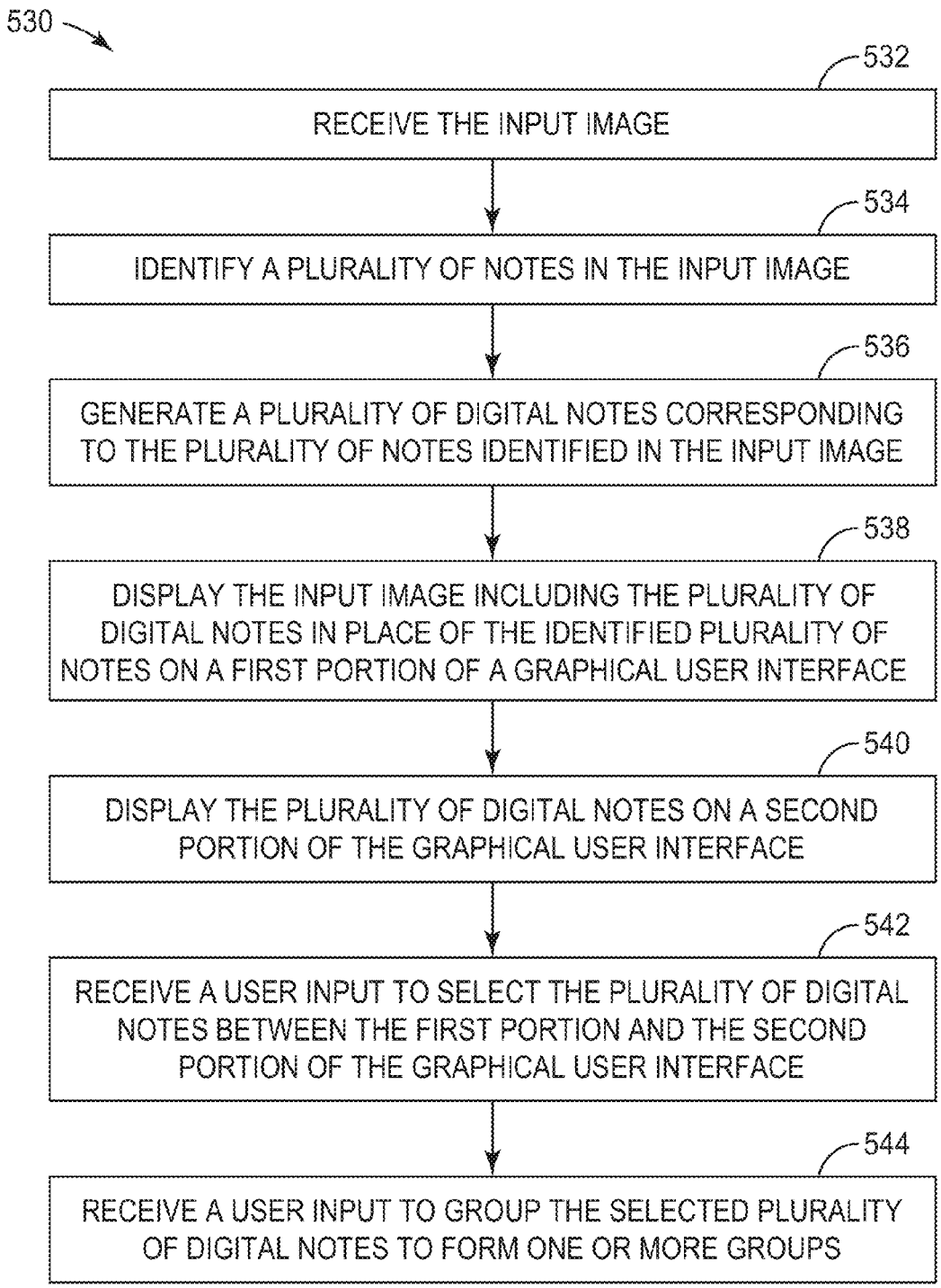
FIG. 21 is a flowchart illustrating an example technique for selecting, grouping, and displaying digital notes through the graphical user interface.

FIG. 21 is a flowchart illustrating example operation of note management application 78 when, in response to user input, selecting a plurality of digital notes in the first portion of the graphical user interface or the second portion of the graphical user interface and grouping the selected plurality of digital notes. In one example of process 530, note management application 78 executing on a computing device, mobile device 15, cloud server 12, or computer system 14, as described in FIGS. 1-3, receives an input image (532). Next, the computing device is configured to identify a plurality of notes in the input image (534). Upon identifying the plurality of notes in the input image, the computing device generates a plurality of digital notes corresponding to the plurality of notes identified in the input image (536). After generating the plurality of digital notes, the computing device is configured to display the input image including the plurality of digital notes overlaid thereon in place of the identified plurality of notes on a first portion of graphical user interface (538). Upon displaying the first portion, the computing device is also configured to display a user-defined set of the digital notes on a second portion of the graphical user interface (540). Next, the computing device is configured to receive a user input to select at least some of the plurality of digital notes by way of the graphical user interface (542). After receiving the user input to select the plurality of digital notes, the computing device is also configured to receive a user input to group the selected plurality of digital notes to form one or more groups (544). In another example, the one or more groups may include a hierarchical order.

Figure 22:
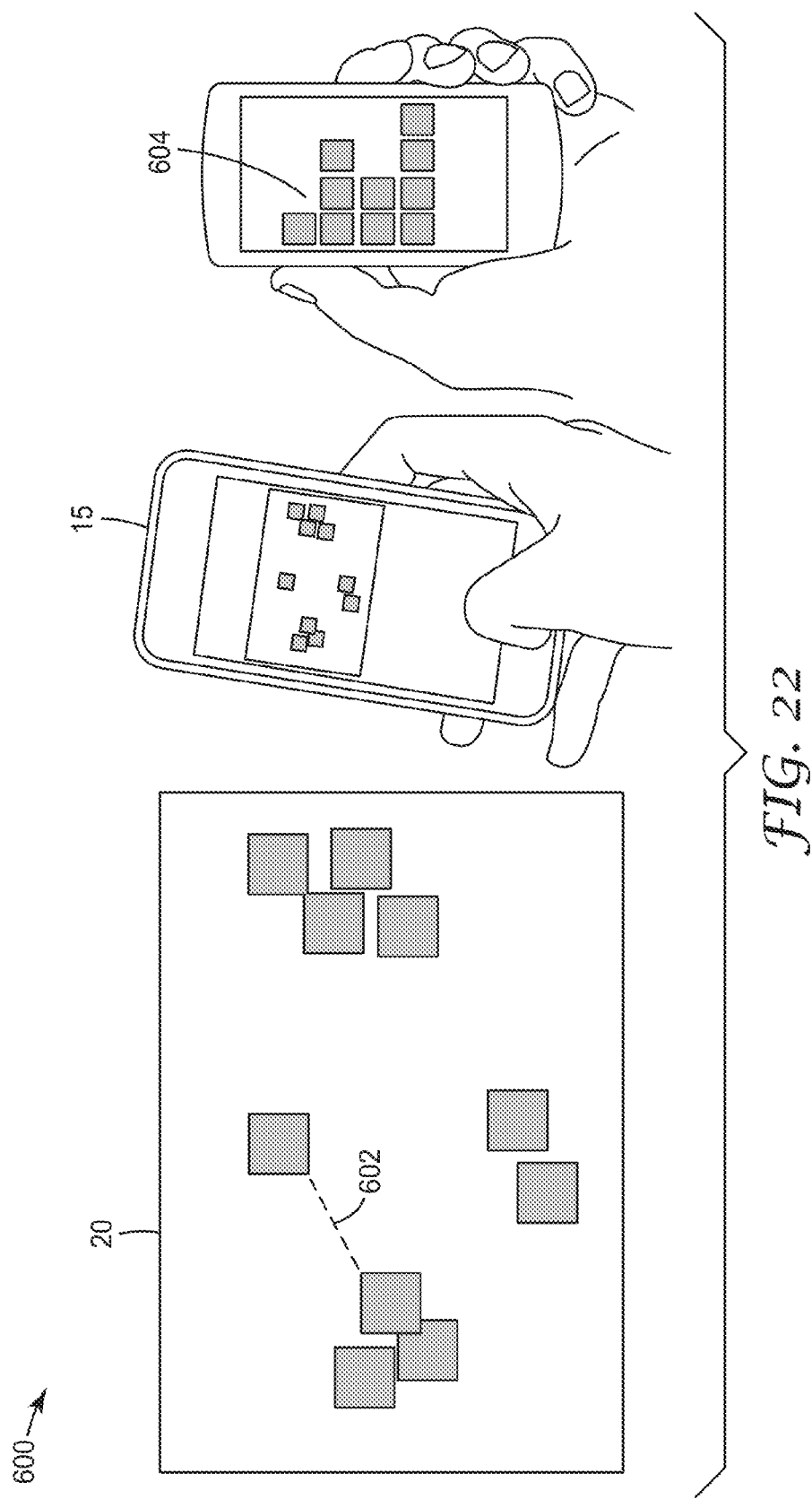
FIG. 22 is a conceptual diagram illustrating an example technique for detecting a group of digital notes, and displaying the grouped digital notes through the graphical user interface.
Figure 23:
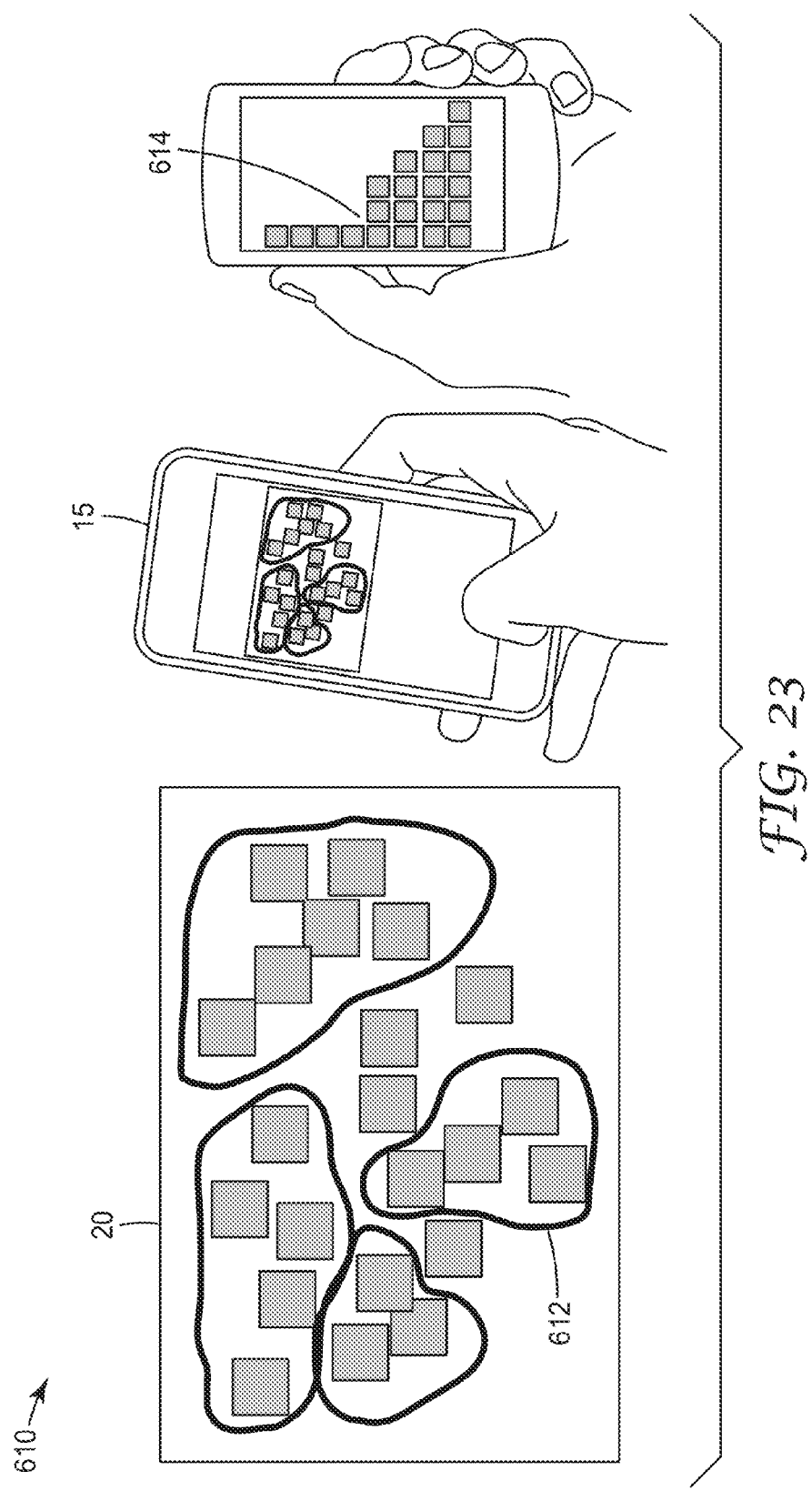
FIG. 23 is a conceptual diagram illustrating another example technique for detecting a group of digital notes, and displaying the grouped digital notes through the graphical user interface.
Figure 24:
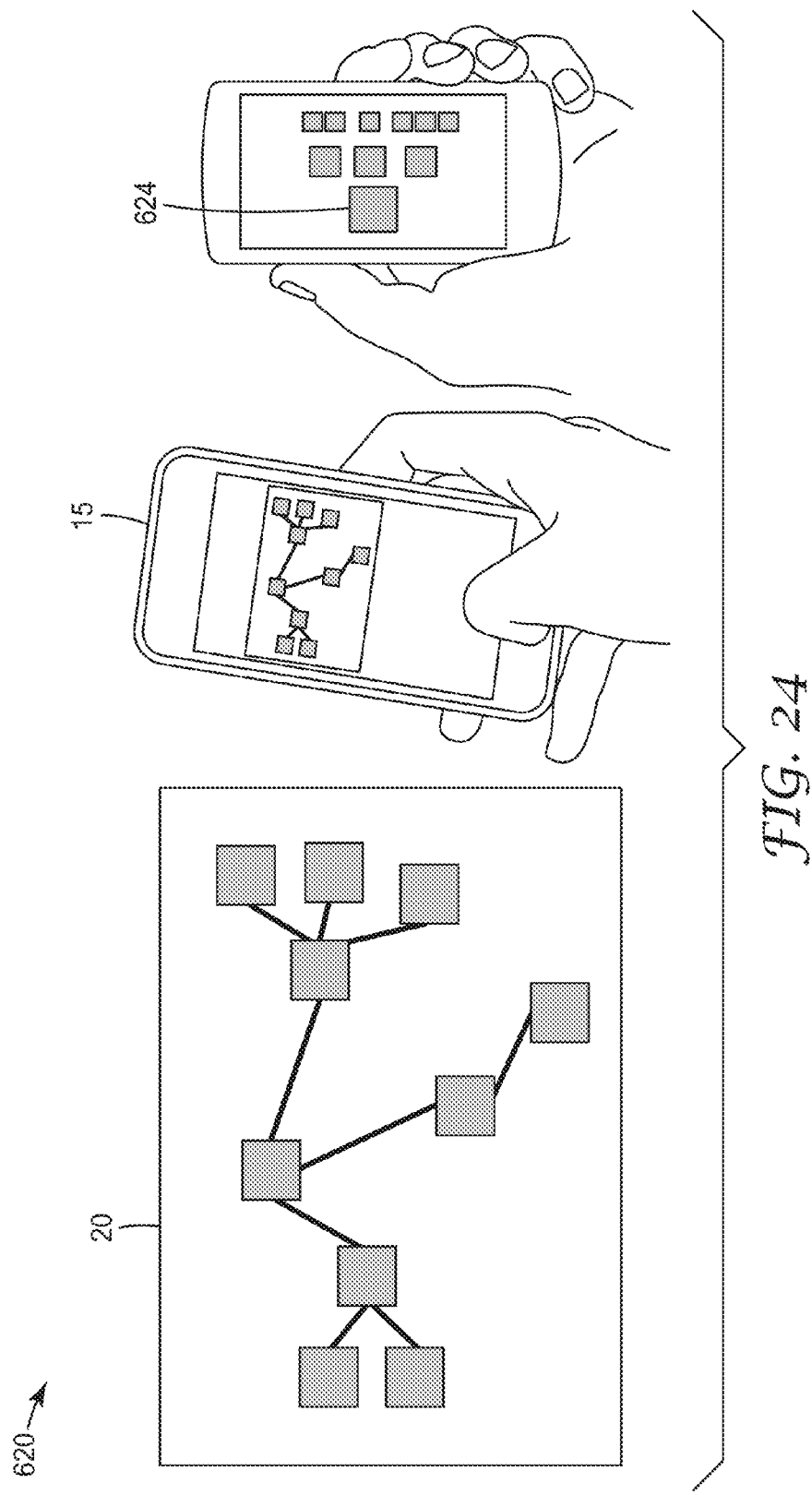
FIG. 24 is a conceptual diagram illustrating an example technique for detecting a hierarchical order of digital notes, and displaying the digital notes in order through the graphical user interface.

FIGS. 22-24 are conceptual diagrams illustrating examples of techniques in which note management application 78 executing on a computing device, such as mobile device 15, detects notes and automatically groups the notes based on one or more detected grouping indicators. Upon receiving an input image as described in FIGS. 1-3, note management application 78 identifies a plurality of physical notes in the input image and generates a plurality of digital notes.

In the example technique 600 illustrated by FIG. 22, note management application 78 processes an input image of workspace 20 that, in this example, includes a plurality of notes separated into groups based on distance. In this example, note management application 78 identifies an indication of one or more groups based on the distances 602 between each of the recognized notes and a threshold distance as determined by mobile device 15. That is, note management application 78 may determine clusters of physical notes within the input image and, based on the clusters, logically associate the digital notes into groups of digital notes. In some examples, note management application 78 may compute a 2D grid or 3D array of position data associated with objects within the input image and, for each recognized physical note, determine an absolute position and boundary for the note within the 2D or 3D space and thereby compute a complete representation of the workspace. Based on this information, note management application 78 can determine minimum distances between each physical note within the virtual space and, based on the distances, determine groupings of the corresponding digital notes corresponding to the physical notes. In other examples, note management application 78 may determine groupings based on a threshold value, which may be a threshold distance or a threshold ratio, pre-determined by a user or calculated by mobile device 15. The use of threshold ratios allows note management application 78 to interpret the natural groupings of notes by the meeting participants without the need to train users as to what absolute distances to place notes to define unique groups. In this example, the note management application 78 compares ratios of distances between nearest notes to establish natural groupings.

FIG. 23 is a conceptual diagram illustrating another example technique 610 in which note management application 78 determines an indication of one or more groups based on loop 612 physically drawn around the plurality of notes within the workspace as detected within the input image by mobile device 15.

FIG. 24 is a conceptual diagram illustrating another example technique 620 in which note management application 78 determines an indication of one or more groups based on one or more lines 622 physically drawn within the workspace so as to connect each of the physical notes and to establish a hierarchical order, as detected within the input image by mobile device 15. In another example, the one or more loops 612 and one or more lines 622 may be a Post-It® Roll and/or Scotch® colored tapes or other material.

In some examples, note management application 78 may be configured to detect a template of group indicators. For example, if the user places a printed template on the wall with a known design, note management application 78 may automatically establish the location of the physical notes relative to the printed template. In one example, the template may be a calendar and the notes may represent tasks or events placed on the calendar. Upon processing an image of the workspace including the template and plurality of physical notes, note management application 78 determines the task/event as taking place on a specific date based on the location of the note within the template. Templates could either be printed and adhered to the wall, or simply projected onto the wall surface.

Moreover, although described by way of example to detection of physical group indicators detected within an input image, the technique may be applied to detection of one or more group indicators gestured or otherwise entered by the user upon interacting with a presence-sensitive display of mobile device or other device.

In some examples, techniques 600, 610, 620 may include using multiple detection modules to recognize notes and extract the content of the plurality of notes, such as a color detection module, a shape detection module, and a pattern detection module as described in FIG. 5. In one example of the color detection module, the technique may include using color spaces such as the RGB, HSV, CIELAB, etc. to identify regions of interest corresponding to the notes for color recognition. In other examples of the shape detection module and the pattern detection module, the notes are further distinguished in their shape and due to the presence of unique patterns detected by shape recognition (e.g., Hough transform, shape context, etc.) and pattern recognition algorithms (e.g., Support Vector Machine, cross-correlation, template matching, etc.) respectively. These algorithms help filter out unwanted objects in the input image or other sources of notes' content and leave only those regions of interest corresponding to the notes.

In some examples, techniques 600, 610, 620 may further include a computing device, such as cloud server 12, computer system 14, and/or mobile devices 15, 16, which are configured to gather content and group indications of the plurality of notes and display the plurality of notes according to the grouping or order of the notes 604, 614, 624, as shown in FIGS. 22-24. In another example, a computer system may be configured to execute any variation of techniques 600, 610, 620. In another example, a non-transitory computer-readable medium including instructions that cause a programmable processor to execute may execute any variation of techniques 600, 610, 620.

The techniques described in this disclosure may be implemented, at least in part, in hardware, software, firmware, or any combination thereof. For example, various aspects of the described techniques, including the disclosed mobile device 15, 16, cloud 12, and/or computer system 14, may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a transitory or non-transitory computer-readable storage medium, containing instructions. Instructions embedded or encoded in a computer-readable medium, including a computer-readable storage medium, may cause one or more programmable processors, or other processors, such one or more processors included in a control system, to implement one or more of the techniques described herein, such as when instructions included or encoded in the computer-readable medium are executed by the one or more processors. Non-transitory computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer-readable media. In some examples, an article of manufacture may comprise one or more computer-readable storage media.

Various examples of this disclosure have been described. These and other examples are within the scope of the following claims.

The invention claimed is:

1. A method comprising:
receiving, by a computing device, an input image of an environment having a plurality of overlapping physical notes, each the plurality of physical notes having a background color and a border having a border color different from the background color;
processing the input image with the computing device to apply a color segmenting process to identify, based on the background colors and the border colors of the overlapping physical notes, borders of each of the overlapping physical notes in the input image;
processing the identified borders of each of the overlapping physical notes as fiducial markers for the respective physical note to extract, based on the fiducial markers, content for each of the respective overlapping physical notes, wherein the extracted content for a respective physical note includes portions of the border of the respective overlapping physical note not covered by another physical note of the plurality of overlapping physical notes;
creating, by the computing device, a plurality of digital notes, each of the digital notes representing a particular one of the identified overlapping physical notes; and
associating, by the computing device, the extracted content for each respective physical note of the identified overlapping physical notes with a corresponding digital note of the plurality of digital notes that represents the respective physical note.

2. The method of claim 1, wherein the color segmenting process is applied in response to determining that the background colors of the plurality of overlapping physical notes are different.

3. The method of claim 1, further comprising:
displaying, by the computing device, the input image on a first portion of a graphical user interface; and
displaying, by the computing device, the digital notes on a second portion of the graphical user interface.

4. The method of claim 1, further comprising:
detecting one or more fiducial markers in the input image that are different than the identified borders of each of the overlapping physical notes,
wherein extracting the content from at least one of the overlapping physical notes comprises extracting, by the computing device and based on the identified fiducial markers that are different than the identified borders, the content from the at least one overlapping physical note.

5. The method of claim 1, wherein extracting the content from each of the plurality of overlapping physical notes includes identifying, by the computing device and based on the fiducial markers for the respective physical note, a size and a shape for each of the respective overlapping physical notes.

6. The method of claim 1, wherein extracting the content from each of the plurality of overlapping physical notes includes identifying the plurality of notes according to a pattern recognition algorithm.

7. The method of claim 6, wherein the pattern recognition algorithm includes at least one of a group consisting of:
a support vector machine;
a cross-correlation; and
a template matching.

8. A non-transitory computer-readable medium comprising instructions for causing a programmable processor to:
receive, by a computing device, an input image of an environment having a plurality of overlapping physical notes, each the plurality of physical notes having a background color and a border having a border color different from the background color;
process the input image with the computing device to apply a color segmenting process to identify, based on the background colors and the border colors of the overlapping physical notes, borders of each of the overlapping physical notes in the input image;
process the identified borders of each of the overlapping physical notes as fiducial markers for the respective physical note to extract, based on the fiducial markers, content for each of the respective overlapping physical notes, wherein the extracted content for a particular physical note includes portions of the border of the particular overlapping physical note not covered by another physical note of the plurality of overlapping physical notes;
create a plurality of digital notes, each of the digital notes representing a particular one of the identified overlapping physical notes; and
associate the extracted content for each respective physical note of the identified overlapping physical notes with a corresponding digital note of the plurality of digital notes that represents the respective physical note.

9. A computing device comprising:
one or more processors;
an image collection module executable by the one or more processors to receive an input image of an environment having a plurality of overlapping physical notes, each the plurality of physical notes having a background color and a border having a border color different from the background color; and
an image processing engine executable by the one or more processors to:
process the input image to apply a color segmenting process to identify, based on the background colors and the border colors of the overlapping physical notes, borders of each of the overlapping physical notes in the input image having the border color;
process the identified borders of each of the overlapping physical notes as fiducial markers for the respective physical note to extract, based on the fiducial markers, content for each of the respective overlapping physical notes, wherein the extracted content for a respective physical note includes portions of the border of the respective overlapping physical note not covered by another physical note of the plurality of overlapping physical notes;
create a plurality of digital notes, each of the digital notes representing a particular one of the identified overlapping physical notes; and
associate the extracted content for each respective physical note of the identified overlapping physical notes with a corresponding digital note of the plurality of digital notes that represents the respective physical note.

10. The device of claim 9, wherein the image collection module includes an image capture device configured to capture the input image.

11. The device of claim 9, wherein the image collection module includes a communication interface configured to receive the input image.

12. The device of claim 11, wherein the communication interface includes a wireless communication device configured to receive the input image.

13. The device of claim 11, wherein the communication interface includes a wired communication device configured to receive the input image.

14. The device of claim 9, wherein the image processing engine is executable by the one or more processors to:
apply the color segmenting process in response to determining that the background colors of the plurality of overlapping physical notes are different.

15. The device of claim 9, where the image processing engine further configured to:
display the input image on a first portion of a graphical user interface; and
display the digital notes on a second portion of the graphical user interface.

16. The device of claim 9, wherein the image processing engine is further executable by the one or more processors to:
detect one or more fiducial markers in the input image that are different than the identified borders of each of the overlapping physical notes,
wherein, to extract the content from at least one of the overlapping physical notes, the image processing engine is executable by the one or more processors to determine, based on the identified fiducial markers that are different than the identified borders, the content from the at least one overlapping physical note.

17. The device of claim 9, wherein, to extract the content from each of the plurality of overlapping physical notes, the image processing engine is executable by the one or more processors to: identify a size and a shape for each of the respective overlapping physical notes.

18. The device of claim 9, wherein, to extract the content from each of the plurality of overlapping physical notes, the image processing engine is executable by the one or more processors to: identify the plurality of notes according to a pattern recognition algorithm.

19. The device of claim 18, wherein the pattern recognition algorithm includes at least one of a group consisting of:
- a support vector machine;
- a cross-correlation; and
- a template matching.

* * * * *